(12) United States Patent
Tsuchida et al.

(10) Patent No.: US 7,280,887 B2
(45) Date of Patent: Oct. 9, 2007

(54) OUTSOURCING METHOD AND SYSTEM FOR SHEET METAL PROCESSING INDUSTRY

(75) Inventors: Koichi Tsuchida, Isehara (JP); Yoshiyuki Matsui, Isehara (JP)

(73) Assignee: Amada Company, Limited, Kanagawa (JP)

( * ) Notice: Subject to any disclaimer, the term of this patent is extended or adjusted under 35 U.S.C. 154(b) by 358 days.

(21) Appl. No.: 10/484,815

(22) PCT Filed: Jul. 30, 2002

(86) PCT No.: PCT/JP02/07739

§ 371 (c)(1),
(2), (4) Date: Jan. 30, 2004

(87) PCT Pub. No.: WO03/012711

PCT Pub. Date: Feb. 13, 2003

(65) Prior Publication Data

US 2004/0215496 A1    Oct. 28, 2004

(30) Foreign Application Priority Data

Jul. 31, 2001 (JP) .............................. 2001-231838

(51) Int. Cl.
G06F 19/00 (2006.01)
G06F 15/00 (2006.01)
G06F 3/00 (2006.01)

(52) U.S. Cl. ............... 700/169; 700/122; 700/145; 700/174; 700/182; 702/188; 715/501.1; 715/530; 715/716; 715/740; 715/964; 715/965

(58) Field of Classification Search .............. 700/9, 700/65, 96, 97, 99, 105, 108–110, 117, 122, 700/145, 148, 169, 174–178, 180, 182, 206; 702/182, 188; 703/6; 705/7, 8, 14, 26, 27, 705/500; 715/501.1, 530, 716, 730, 733, 715/740, 964, 965
See application file for complete search history.

(56) References Cited

U.S. PATENT DOCUMENTS 4,391,123 A * 7/1983 Salvagnini ................ 72/464

(Continued)

FOREIGN PATENT DOCUMENTS

JP          11-195062          7/1999

(Continued)

OTHER PUBLICATIONS

English Language Abstract of JP 11-282799.

(Continued)

*Primary Examiner*—Leo Picard
*Assistant Examiner*—Sean Shechtman
(74) *Attorney, Agent, or Firm*—Greenblum, Bernstein, P.L.C.

(57) ABSTRACT

An outsourcing service center (7) discloses information obtained through outsourcing services for a first sheet metal processing factory (3) to promote sales. A first ordering customer (5) requests a first sheet metal processing factory (3) to make an estimate for manufacturing a product. The first sheet metal processing factory (3) requests an outsourcing center (7) to perform the work of making the estimate. The outsourcing center (7) logs in to a computer (9) of the first sheet metal processing factory via a computer (15) of the outsourcing center, and, by remote control, works together with the first sheet metal processing factory to perform outsourcing services such as making an estimate and creating NC process data. The processes of these remotely performed services are stored in memory constituting know-how and are then disclosed on a Web page. In this way, examples of previous work successes are introduced and thereby used for promoting CAD/CAM software used in the work processes.

17 Claims, 22 Drawing Sheets

U.S. PATENT DOCUMENTS

| | | | |
|---|---|---|---|
| 6,295,513 B1 * | 9/2001 | Thackston | 703/1 |
| 6,385,497 B1 * | 5/2002 | Ogushi et al. | 700/110 |
| 6,580,959 B1 * | 6/2003 | Mazumder | 700/121 |
| 7,003,371 B2 | 2/2006 | Tsuchida et al. | |
| 2002/0049565 A1 * | 4/2002 | Kirila et al. | 702/188 |
| 2002/0072821 A1 * | 6/2002 | Baker | 700/98 |
| 2002/0169850 A1 * | 11/2002 | Batke et al. | 709/218 |
| 2004/0148230 A1 | 7/2004 | Matsui et al. | |
| 2004/0186759 A1 | 9/2004 | Fukui et al. | |

FOREIGN PATENT DOCUMENTS

| | | |
|---|---|---|
| JP | 11-282799 | 10/1999 |
| JP | 2001-075626 | 3/2001 |
| WO | 01/50307 | 7/2001 |

OTHER PUBLICATIONS

English Language Abstract of JP 11-195062.
English Language Abstract of JP 2001-075626.
U.S. Appl. No. 09/807,965 to Tamura et al., filed Apr. 26, 2001, entitled "Sales Support System".

* cited by examiner

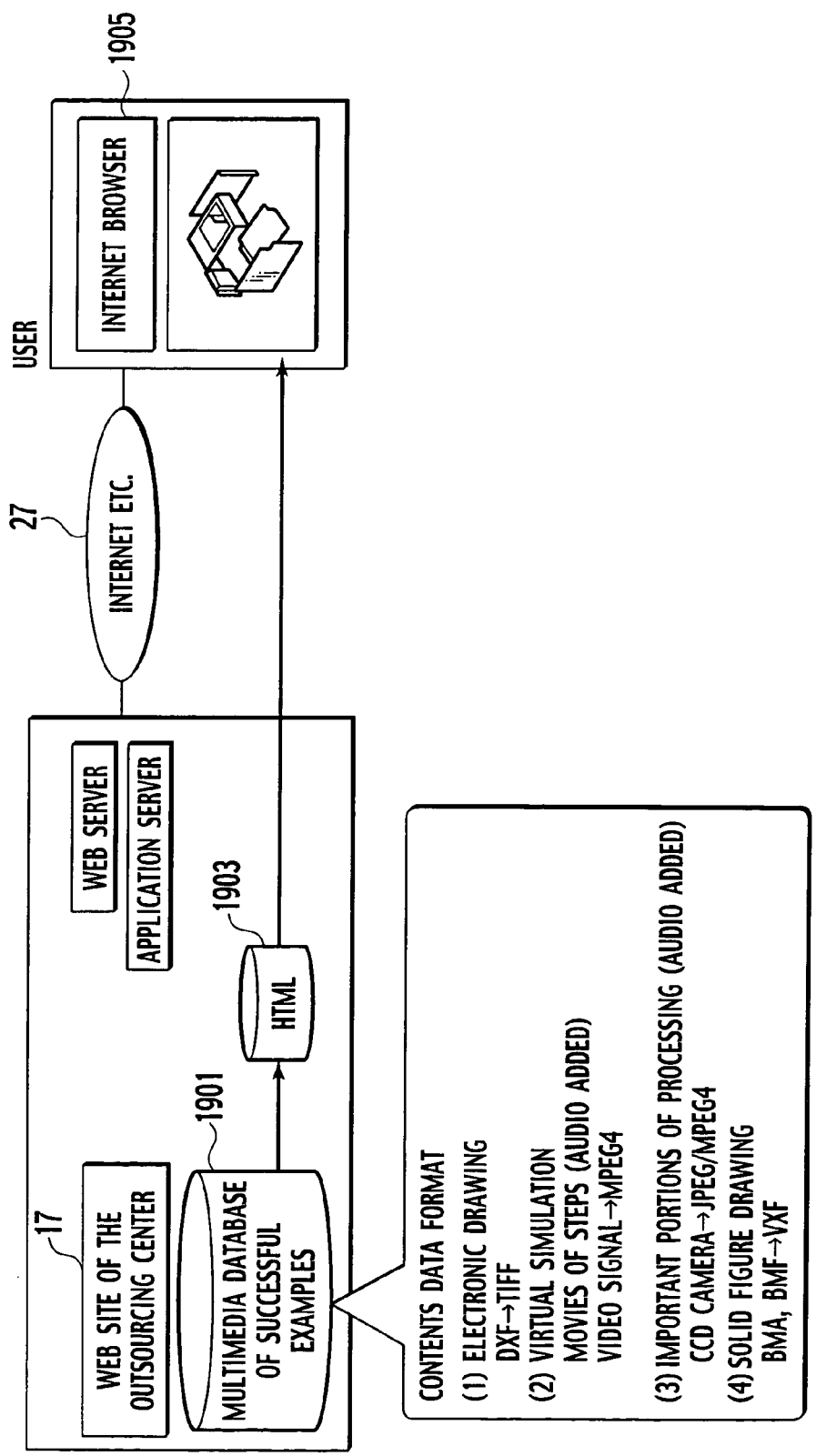

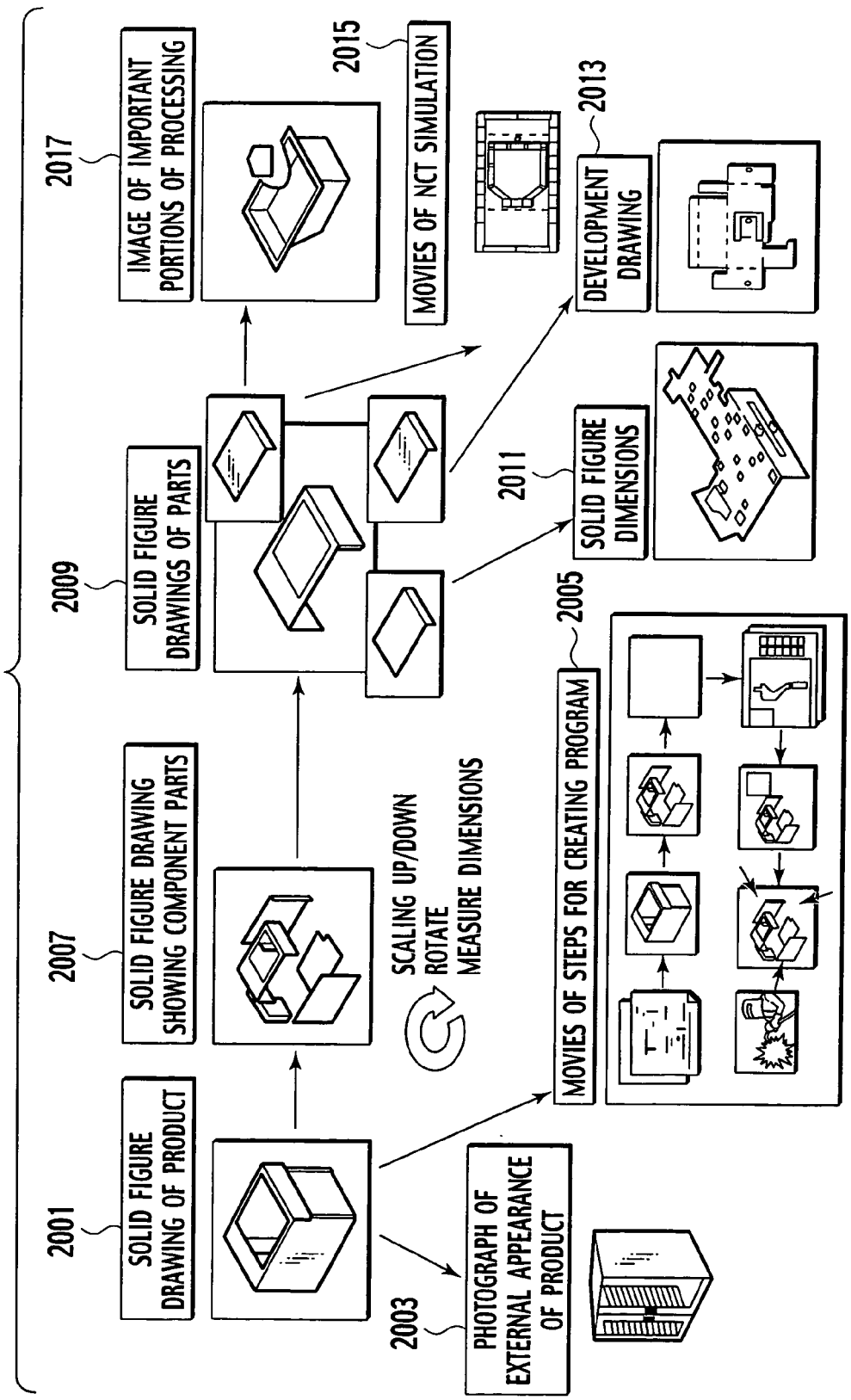

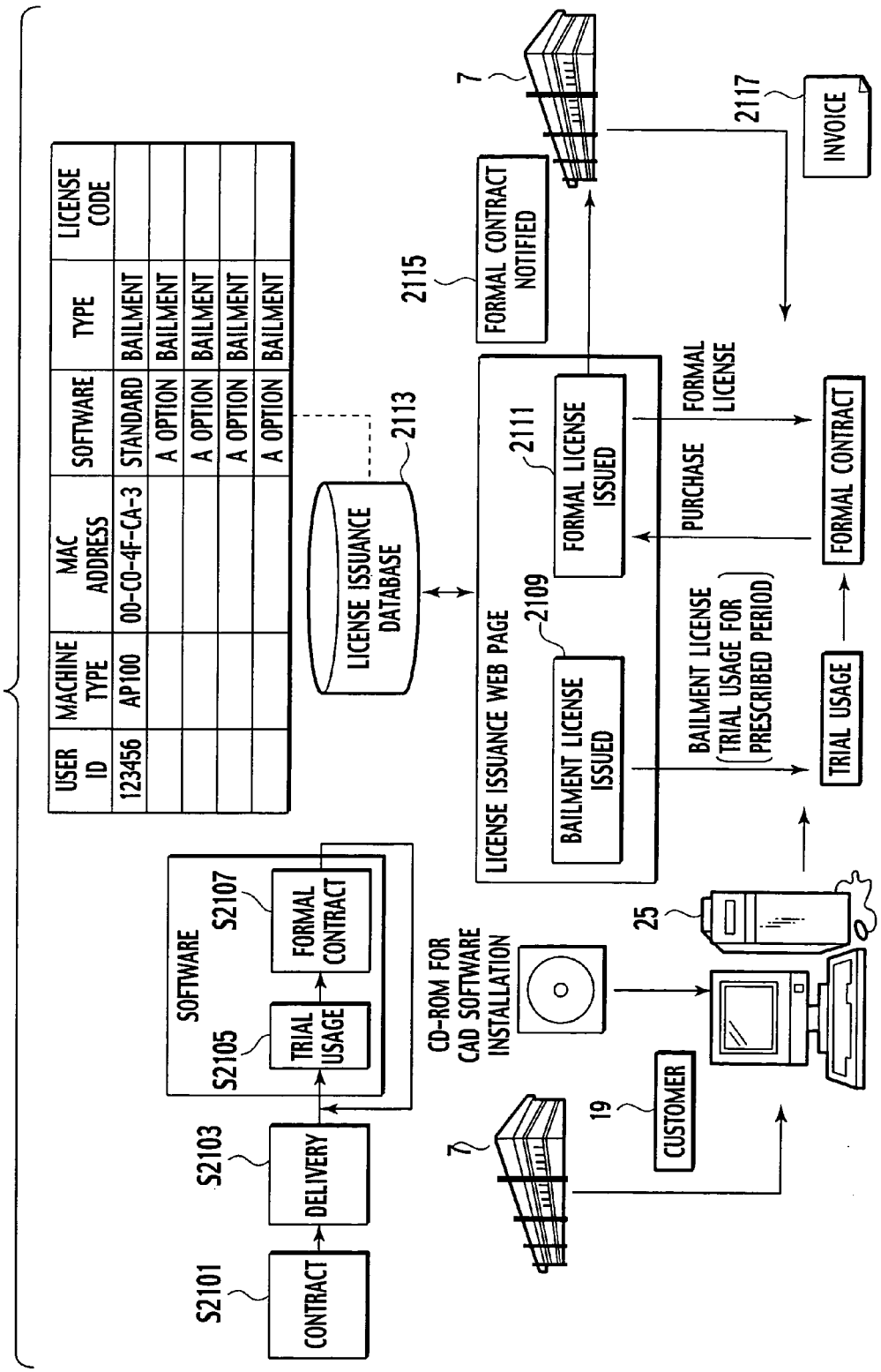

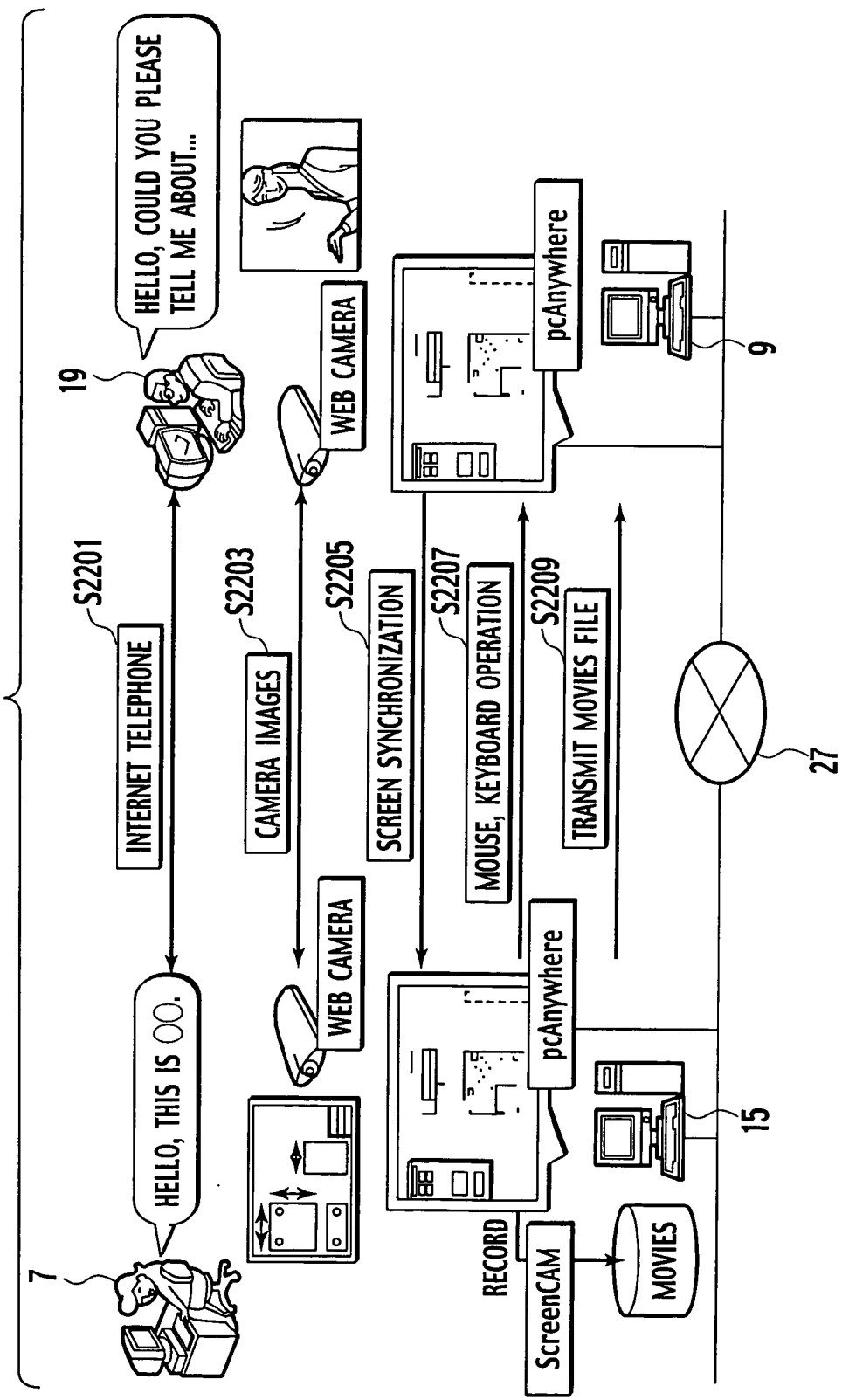

OUTSOURCING METHOD AND SYSTEM FOR SHEET METAL PROCESSING INDUSTRY

This application claims benefit of priority to Japanese Patent Application No. 2001-231838 filed by the same applicant on Jul. 31, 2001 the entire contents of which are incorporated by reference herein.

TECHNICAL FIELD

The present invention relates to a method and a system for outsourcing related to the metal working industry, such as the sheet metal working industry. More specifically, the present invention relates to a method and a system for outsourcing related to the sheet metal working industry in which an outsourcing system discloses information on examples of previous successes acquired by performing outsourcing services and provides a product related to that successful example.

BACKGROUND ART

Generally, the outsourcing service performed for a sheet metal processing factory by an outsourcing center only involves performing work on behalf of the sheet metal processing factory, especially operating the CAD/CAM system provided by the sheet metal processing factory on behalf of the factory. The result of such an arrangement is that there is no accumulation and disclosure of information acquired by the outsourcing center related to sheet metal processing factories.

When the maker of a CAD/CAM software product promotes or publicizes a CAD/CAM software product that they have created themselves, this promotion or publicity is performed focusing on the functions of the CAD/CAM software product.

Further, a service center may provide 24 hour service via an internet Web site but that consists mainly of posting answers to questions posed by a user.

These kinds of outsourcing services incur problems. Publicity performed by a product manufacturer selling products related to CAD/CAM software does not use examples of previous successes from users, like a sheet metal processing factory who have actually used the product, so a sheet metal processing factory that is the potential buyer of that CAD/CAM software product cannot get an accurate grasp of the actual value of using the product.

Further, the information posted on a Web site consists mainly of answers to questions asked, there may however be no question involved, and as there are few sheet metal processing factories who actively use such sites, they cannot be used for promoting or publicizing a product.

Moreover, there are few opportunities and places where prospective users actively disclose the product production capabilities of their own plant and so it is difficult for the users to locate a new ordering customer.

DISCLOSURE OF INVENTION

With such problems in view, the present invention proposes a method for outsourcing of services performed related to the sheet metal working industry that is an outsourcing method by which a sheet metal processing factory that receives an order for manufacturing a sheet metal product has work for manufacturing a sheet metal product performed by another party using a computer of the sheet metal processing factory and by which information acquired in the performance of the work for manufacturing the sheet metal product is disclosed, which method should preferably include the steps of:

logging in by a computer of an outsourcing center to a computer of a sheet metal processing factory in response to a request from the sheet metal processing factory;

operating of the computer of the sheet metal processing factory by the computer of the outsourcing center logged in to the computer of the sheet metal processing factory for performance a work for manufacturing a sheet metal product on behalf of the sheet metal processing factory based on instructions from the sheet metal operating factory;

creating contents for presentation by editing information obtained through the performance of the work for manufacturing the sheet metal product and accumulating the created contents in the outsourcing center; and disclosing the contents for presentation.

It is preferable that the step for disclosing the contents for presentation includes editing the contents for presentation into information on an example of success that is content for promoting sales of a software product related to the contents for presentation.

It is also preferable that the contents for presentation include one or more of movies, photographs, a solid figure model or images of important portions of processing.

The method for outsourcing preferably include a step for creating a hyperlink relationship between the contents for presentation that are related, to synergetically relate the related contents for presentation together.

Further, the method for outsourcing should preferably include a step for accumulating the contents for presentation in the computer of the sheet metal processing factory as know-how.

Again, the method for outsourcing should preferably include a step for creating the contents for presentation using the computer of the sheet metal processing factory.

Moreover, the present invention proposes system for outsourcing of services performed related to the metal working industry that is a system for outsourcing by which a sheet metal processing factory that receives an order for manufacturing a sheet metal product has a work for manufacturing the sheet metal product performed by another party using a computer of the sheet metal processing factory and by which information acquired in the performance of the work for manufacturing the sheet metal product is disclosed, which system should preferably include:

means of a computer of an outsourcing center for logging in to the computer of a sheet metal processing factory in response to a request from the sheet metal processing factory;

means of the computer of the outsourcing center logged in to the computer of the sheet metal processing factory for operating of the computer of the sheet metal processing factory for performing a work for manufacturing a sheet metal product on behalf of the sheet metal processing factory based on instructions from the sheet metal operating factory;

means for creating contents for presentation by editing information obtained through the performance of the work for manufacturing the sheet metal product and accumulating the created contents in the outsourcing center; and means for disclosing the contents for presentation.

BRIEF DESCRIPTION OF DRAWINGS

FIG. 3 is an explanatory drawing showing the flow for expanding sales opportunities for software products and the like.

FIG. 19 is an explanatory drawing showing accessing of contents for presentation.

FIG. 20 is an explanatory drawing showing contents for presentation with attached hyperlink FIG. 21 is an explanatory drawing showing the flow when CAD software is purchased.

FIG. 22 is an explanatory drawing showing support provided for using CAD software.

BEST MODE FOR CARRYING OUT THE INVENTION

Figure 1:
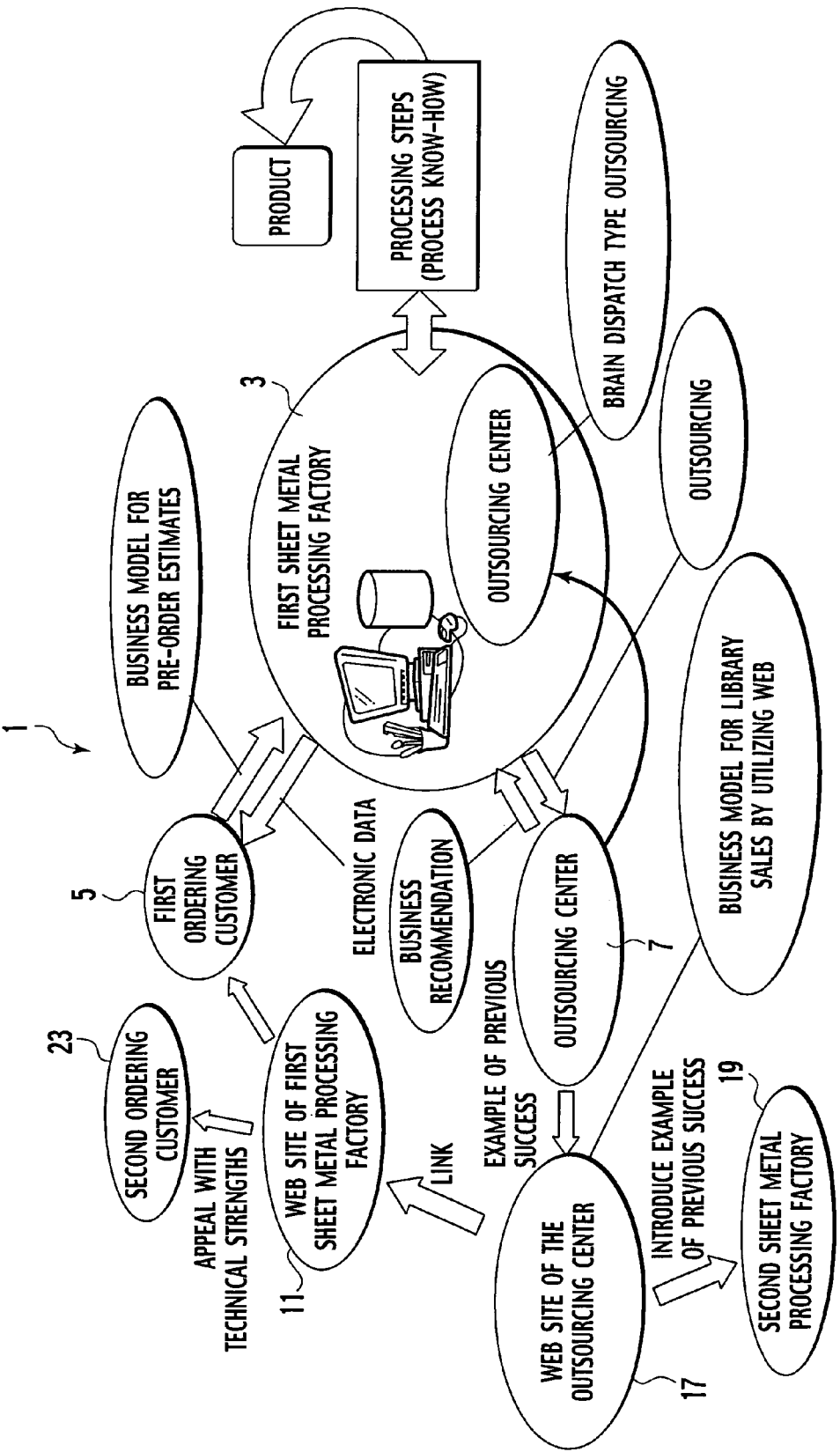
FIG. 1 is a schematic view of an outsourcing system.
Figure 2:
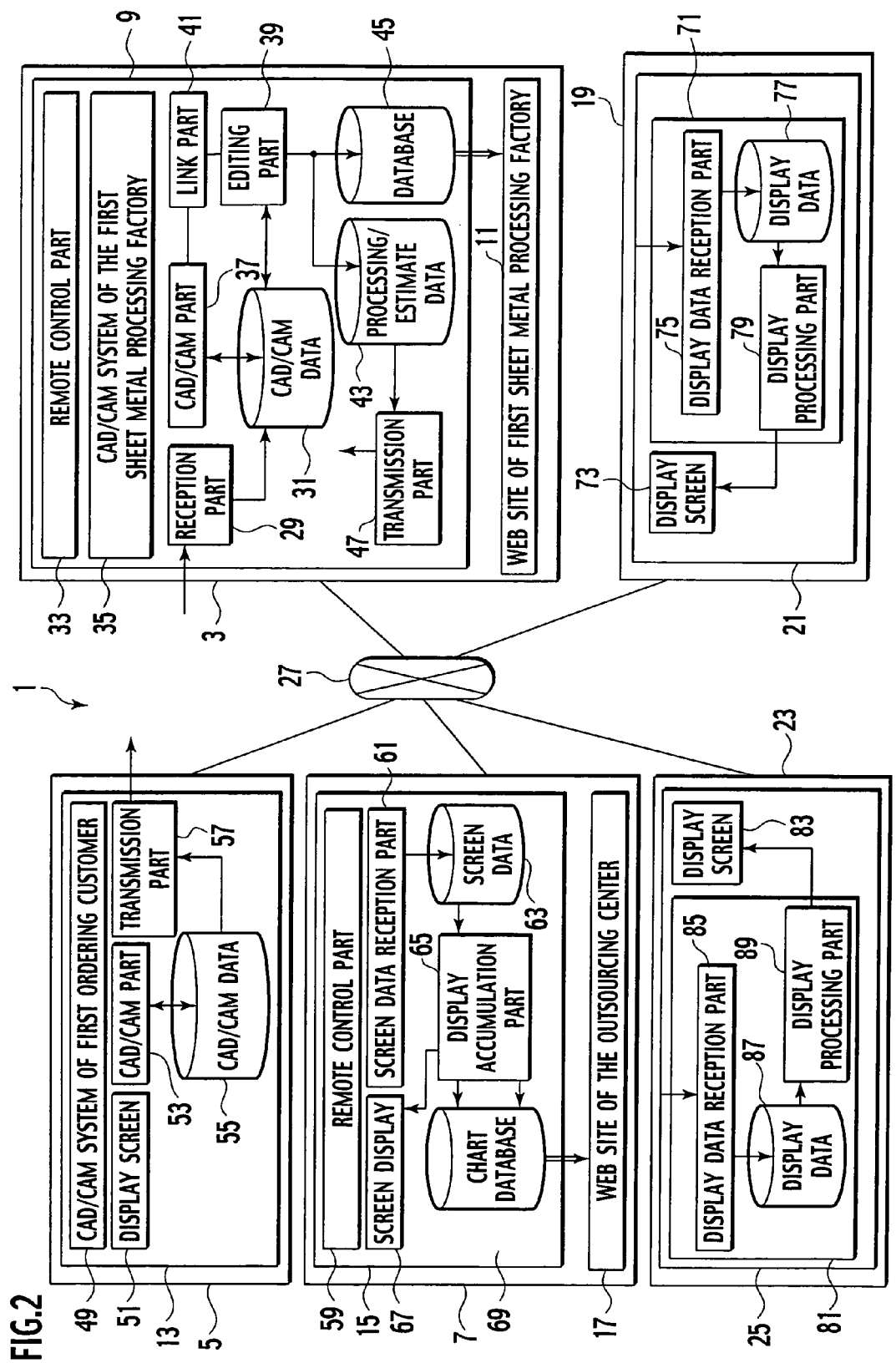
FIG. 2 is a schematic view of an outsourcing system.

An embodiment of the present invention will now be described with reference to the drawings. FIG. 1 and FIG. 2 schematically show an outsourcing system 1 related to this embodiment.

As shown in FIG. 1, this system is not constructed such that a sheet metal processing for processing a sheet metal products is the subject of outsourcing. The outsourcing center 7 of this system performs work outsourced from a sheet metal processing factory and produces and sells CAD/CAM system software for sheet metal processing. Further, the outsourcing center 7 performs the work of making a Web site for a sheet metal processing factory.

The outsourcing system 1 includes a first sheet metal processing factory 3 that is a sheet metal processing factory that receives a request to manufacture a sheet metal product, a first ordering customer 5 that issues a request to the first sheet metal processing factory 3 to manufacture a product and an outsourcing center 7 that performs part of the work of the first sheet metal processing factory 3 instead of the sheet metal processing factory 3.

The outsourcing services performed by the outsourcing center 7 include for example making a pre-order estimate, proposing business, brain power dispatch type outsourcing and software library sales.

The first sheet metal processing factory 3 has a Web site 11 of the first sheet metal processing factory and the outsourcing center 7 has a Web site 17 of the outsourcing center.

The first sheet metal processing factory 3 can display their own product production capabilities on the Web site 17 of the outsourcing center and the Web site 11 of the first sheet metal processing factory made by the outsourcing center 7, such that the first sheet metal processing factory 3 is able to promote the appeal of those capabilities to a second ordering customer 23, in an effort to procure new customers. Moreover, because this enables the first sheet metal processing factory 3 to appeal to their existing customer, a first ordering customer 5 with the product production capabilities, the first sheet metal processing factory 3 is able to achieve an even greater level of respect.

Further, the outsourcing center 7 accumulates examples of previous successes of sheet metal processing factories which the outsourcing center 7 finds through performing outsourcing work for such factories and can disclose these examples from Web site so that this Web site can be utilized as a new sales channel for products from the software library sold by the outsourcing center 7.

A more detailed explanation will now be provided with reference to FIG. 2. The first sheet metal processing factory 3 provides a computer 9 of the first sheet metal processing factory, (a computer provided by the sheet metal processing factory that receives an order to manufacture a sheet metal product). The Web site 11 of the first sheet metal processing factory is managed from this computer 9.

The first ordering customer 5, the ordering customer who makes a request for manufacturing a product to the first sheet metal processing factory 3, provides a computer 13 of the first ordering customer.

The outsourcing center 7 provides a computer 15 of the outsourcing center and the Web site 17 of the outsourcing center.

A second sheet metal processing factory 19, that is a sheet metal processing factory collecting information over the Internet, provides a computer 21 of the second sheet metal processing factory. A second ordering customer 23 that is an ordering customer collecting information over the Internet provides a computer 25 of the second ordering customer.

The computer 9 of the first sheet metal processing factory, the computer 13 of the first ordering customer, the computer 15 of the outsourcing center, the computer 21 of the second sheet metal processing factory and the computer 25 of the second ordering customer are in a condition in which communication therebetween is possible through a communications system 27 such as the Internet.

When the computer 9 of the first sheet metal processing factory receives a request from the first ordering customer 5 to produce an estimate for an order to manufacture a product for example, the computer 9 of the first sheet metal processing factory receives CAD/CAM data for this product using a reception part 29 provided in the computer 9 and stores the CAD/CAM data in a CAD/CAM data memory 31 provided in the computer 9.

The computer 9 of the first sheet metal processing factory also comprises a remote control part 33 enabling the computer 9 to be operated from the outsourcing center 7 by remote control, a CAD/CAM system 35 of the first sheet metal processing factory, a CAD/CAM part 37, and an editing part 39. The CAD/CAM part 37 and the editing part 39 are linked via a linking part 41.

Processing and estimate related data created in the editing part 39 is stored in a processing and estimate data memory 43. At the same time this data is accumulated in a database 45 as know-how related data. Contents for presentation edited based on data accumulated in this database 45 can be disclosed on the Web site 11 of the first sheet metal processing factory.

Data stored in the processing and estimate data memory 43 is transmitted to the first ordering customer 5 through a transmission part 47. Further, when the customer has given formal approval for an order the processing related data and the like are transmitted via the transmission part 47 to an NC machine tool so that actual processing of the product can be performed.

The computer 13 of the first ordering customer comprises a CAD/CAM system 49 of the first ordering customer, a display screen 51, a CAD/CAM system 53 that provides a part of the functions of the CAD/CAM system 49, a CAD/CAM data memory 55 and a transmission part 57.

CAD/CAM data created in the CAD/CAM system 53 is transmitted to the first sheet metal processing factory 3 via the transmission part 57 simultaneously with the request for an estimate for manufacturing the product.

The computer 15 of the outsourcing center comprises a remote control part 59 that enables remote control directed toward the computer 9 of the first sheet metal processing factory 3, a screen data reception part 61 for receiving screen data of the computer 9 of the first sheet metal processing factory obtained by remote control, a screen data memory 63 for storing screen data received at the screen data reception part 61 and a display and accumulation part 65 for reading-in screen data from the screen data memory 63 and displaying that data on a display screen 67 and accumulating that data in a chart database 69.

The computer 21 of the second sheet metal processing factory comprises a browser 71 of the second sheet metal processing factory having browser functionality for receiving data used for screen display from a home page for example and displaying the data on a screen display, and a display screen 73 that is a screen for displaying the data thus acquired. The browser 71 of the second sheet metal processing factory comprises a display data reception part 75 for receiving, for example via the Internet, data used for displaying on screen, a display data memory 77 for storing received data and a display processing part 79 for reading-in display data from the display data memory 77 and displaying the data on the display screen 73.

The computer 25 of the second ordering customer comprises a browser 81 of the second ordering customer having browser functionality for receiving data used for screen display from a home page for example and displaying the data on a display screen, and a display screen 83 that is a screen for displaying the data acquired. The browser 81 of the second ordering customer comprises a display data reception part 85 for receiving, for example via the Internet, data used for displaying on screen, a display data memory 87 for storing received data and a display processing part 89 for reading-in display data from the display data memory 87 and displaying the data on the display screen 83.

The operations of the outsourcing system 1 will now be described with reference to FIGS. 3 to 22.

Figure 3:
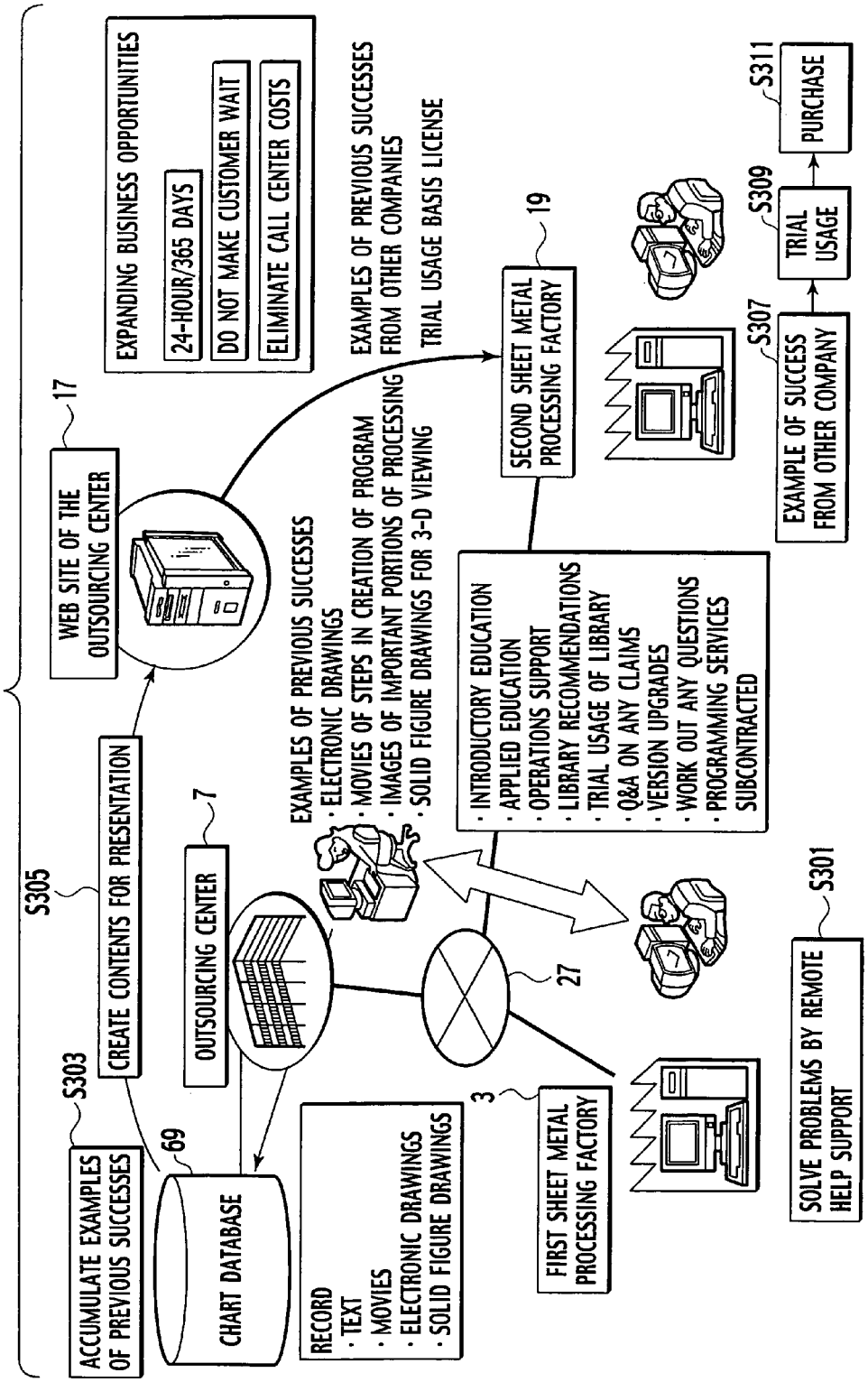

FIG. 3 shows a method for expanding sales opportunities for CAD/CAM software and the like.

In step S301, the first sheet metal processing factory 3 receives a request for an estimate for manufacturing a product from the first ordering customer 5 (not shown in the drawing). The first sheet metal processing factory 3 requests performance of services from the outsourcing center 7, to make the estimate and create process data using the CAD/CAM system 35 of the first sheet metal processing factory (not shown in the drawing).

The outsourcing center 7 logs in to the computer 9 of the first sheet metal processing factory (not shown in the drawing) via the computer 15 of the outsourcing center (not shown in the drawing) and performs their service by remote control. This remotely performed service from a CAD/CAM operation specialist of the outsourcing center 7 is performed working together with for example, the president, factory manager and an experienced sheet metal bending engineer of the first sheet metal processing factory 3 to make the estimate and create the process data on the computer screen. This arrangement enables this work to be performed appropriately.

In step S303, the content of the service performed in step S301 is stored in the chart database 69 as an example of a previous success. This chart database 69 includes text data, movie (moving image) data, electronic data, solid figure drawing data and the like.

In step S305, contents for presentation is produced from data accumulated in the chart database 69. This contents for presentation is disclosed on the Web site 17 of the outsourcing center. The content disclosed is the content of the successful example. More specifically, the disclosed content includes electronic drawings, a movie of the steps for creating a program (process data), images on important portions of processing, solid figure drawings for 3-D viewing and the like.

In step S307, the second sheet metal processing factory 19 accesses the Web site 17 of the outsourcing center and views the successful example.

In step S309, the second sheet metal processing factory 19 wishes to employ the successful example enjoyed by the other company and so the second sheet metal processing factory 19 requests a trial usage of the CAD/CAM software that was one of the key points in the successful example and then commences that usage on a trial basis.

In step S311, the second sheet metal processing factory 19 decides to purchase the CAD/CAM software as a result of the usage on a trial basis.

During the trial usage the outsourcing center 7 provides support for systems and the like of the second sheet metal processing factory 19. That content of that support includes introductory education, further applied education, operations support, recommendations from the library, trial usage of products from the software library, Q&A on any claims made by the purchaser, version upgrades, working out further questions and accepting requests to provide further programming services.

Figure 4:
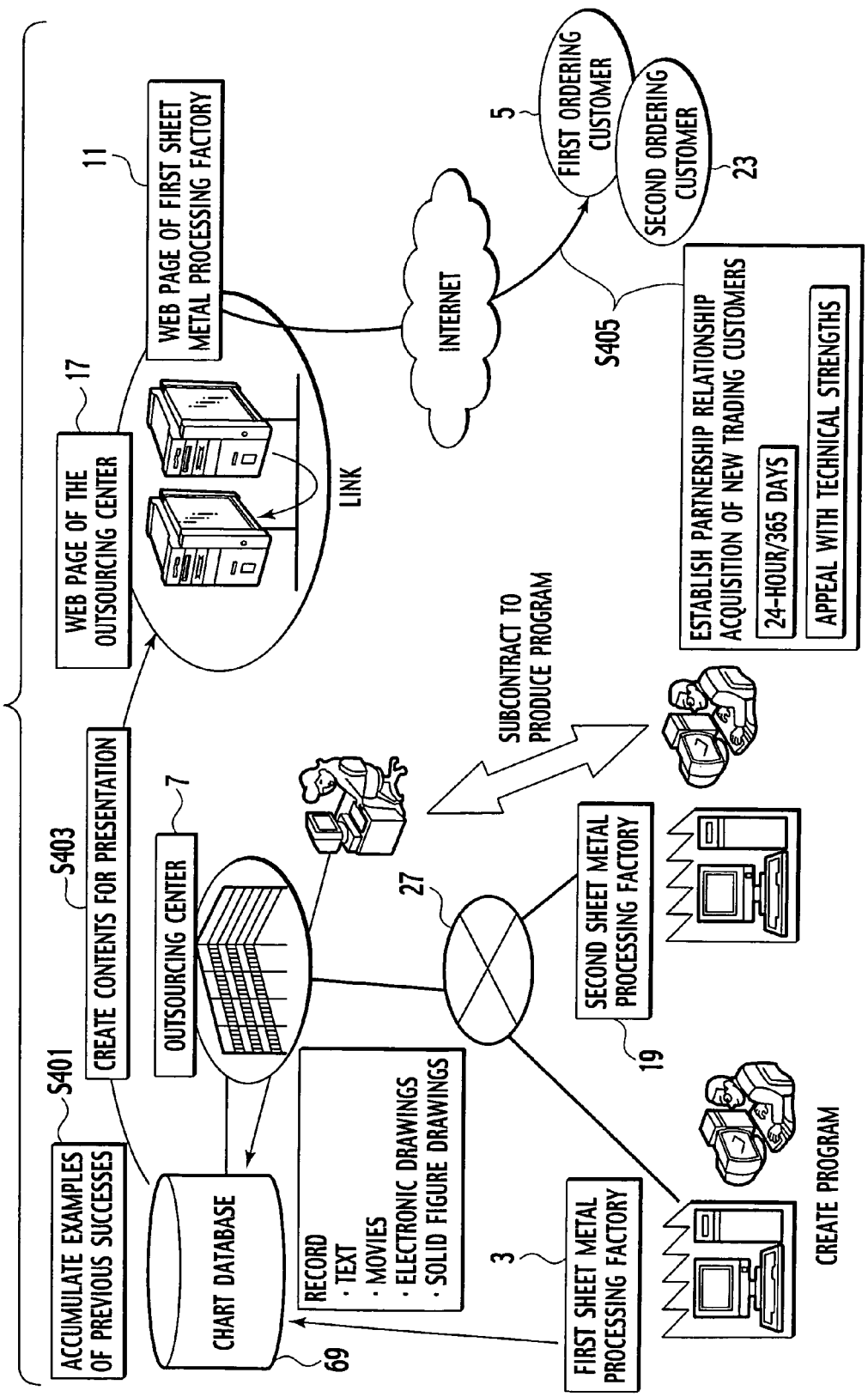
FIG. 4 is an explanatory drawing showing the flow for obtaining new customers.

FIG. 4 shows the flow occurring as the first sheet metal processing factory 3 uses their technical strengths as a source of appeal to bring in new customers.

In step S401, the first sheet metal processing factory 3 receives a request to make an estimate for manufacturing a product from the first ordering customer 5. The first sheet metal processing factory 3 requests performance of services from the outsourcing center 7, to make the estimate and create process data using the CAD/CAM system 35 of the first sheet metal processing factory (not shown in the drawing). The outsourcing center 7 logs in to the computer 9 of the first sheet metal processing factory (not shown in the drawing) via the computer 15 of the outsourcing center (not shown in the drawing) and performs the service by remote. This remote service from a CAD/CAM operation specialist of the outsourcing center 7 is performed working together with for example, the president, factory manager and an experienced sheet metal bending engineer of the first sheet metal processing factory 3 to make the estimate and create the process data on the computer screen. This arrangement enables this work to be performed appropriately.

The content of the outsourcing services performed is accumulated in the chart database 69. Data stored in the chart database 69 includes text data, movie (moving image) data, electronic data, solid figure drawing data and the like.

In step S403, contents for presentation is created from the data accumulated in the chart database 69. This contents for presentation is disclosed on the Web site 17 of the outsourcing center. The content disclosed is the content of the successful example. More specifically, the disclosed content includes electronic drawings, a movie of the steps for creating the program (process data), images of important portions of processing, solid figure drawings for 3D viewing and the like. The Web site 11 of the first sheet metal processing factory is linked to this Web site 17 of the outsourcing center.

In step S405, the first ordering customer 5 and the second ordering customer 23 access the Web site 17 of the outsourcing center. Thus, the first ordering customer 5 and the second ordering customer 23 are made aware of the high level technical strengths of the first sheet metal processing factory 3. This results in facilitation of establishment of a partnership relationship and acquisition of new trading customers.

Figure 5:
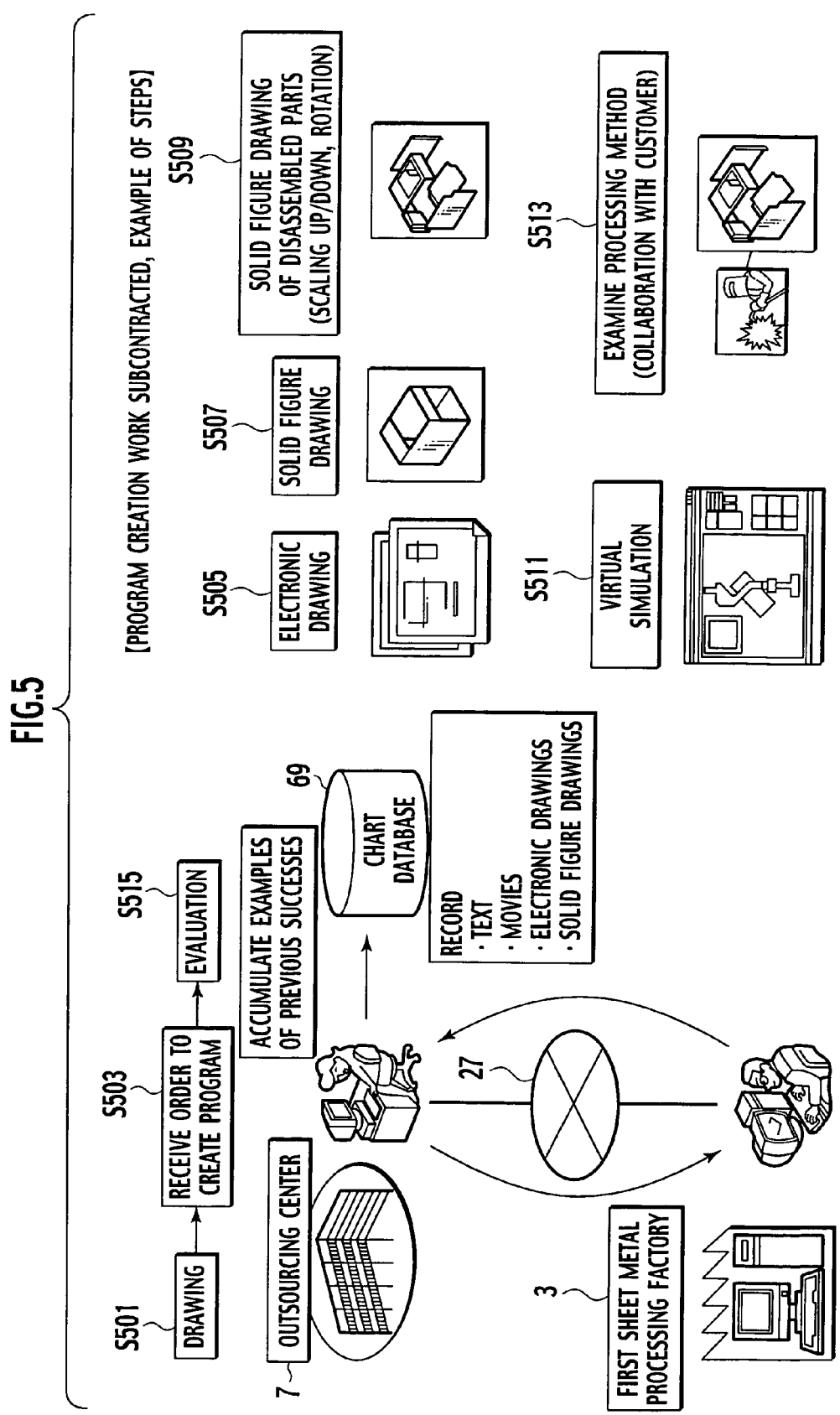
FIG. 5 is an explanatory drawing showing the subject of contents for presentation

The content accumulated through a delegated job of creating a program (process data) which forms one part of the contents for presentation will now be described with reference to FIG. 5.

In step S501, the first sheet metal processing factory 3 transfers a trihedral figure drawing of the product to the outsourcing center 7 so that the outsourcing center 7 can create a program.

In step S503, the outsourcing center 7 accepts the delegated job of creating this program.

In step S505, a trihedral figure only is extracted from electronic drawings and the faces of the product are composed together paying consideration to the extension values required for bending. Further, data is added for plate thickness and materials required to produce the solid figure drawing of the product.

In step S507, the solid figure drawing that is a three-dimensional model of the product is automatically produced.

In step S509, while referring to this solid figure drawing and operating in accordance with instructions issued by the president, factory manager an experienced bending engineer of the first sheet metal processing factory 3, the CAD/CAM operator of the outsourcing center 7 decides on the locations to cut up the product that enable the processing of the product to actually be performed. This enables the product to be divided up into a plurality of parts.

In step S511, a virtual simulation is performed of the bending steps related to each part divided in step S509.

In step S513, the processing method used at the time these parts are assembled is examined.

In step S515, the president, factory manager and an experienced bending engineer of the first sheet metal processing factory 3 make an evaluation of all of the steps for processing the product.

Because the above steps are performed from the computer 15 of the outsourcing center by remote control, movie data of the steps can be accumulated in the chart database 69. This data is edited and used to produce contents for presentation.

Figure 6:
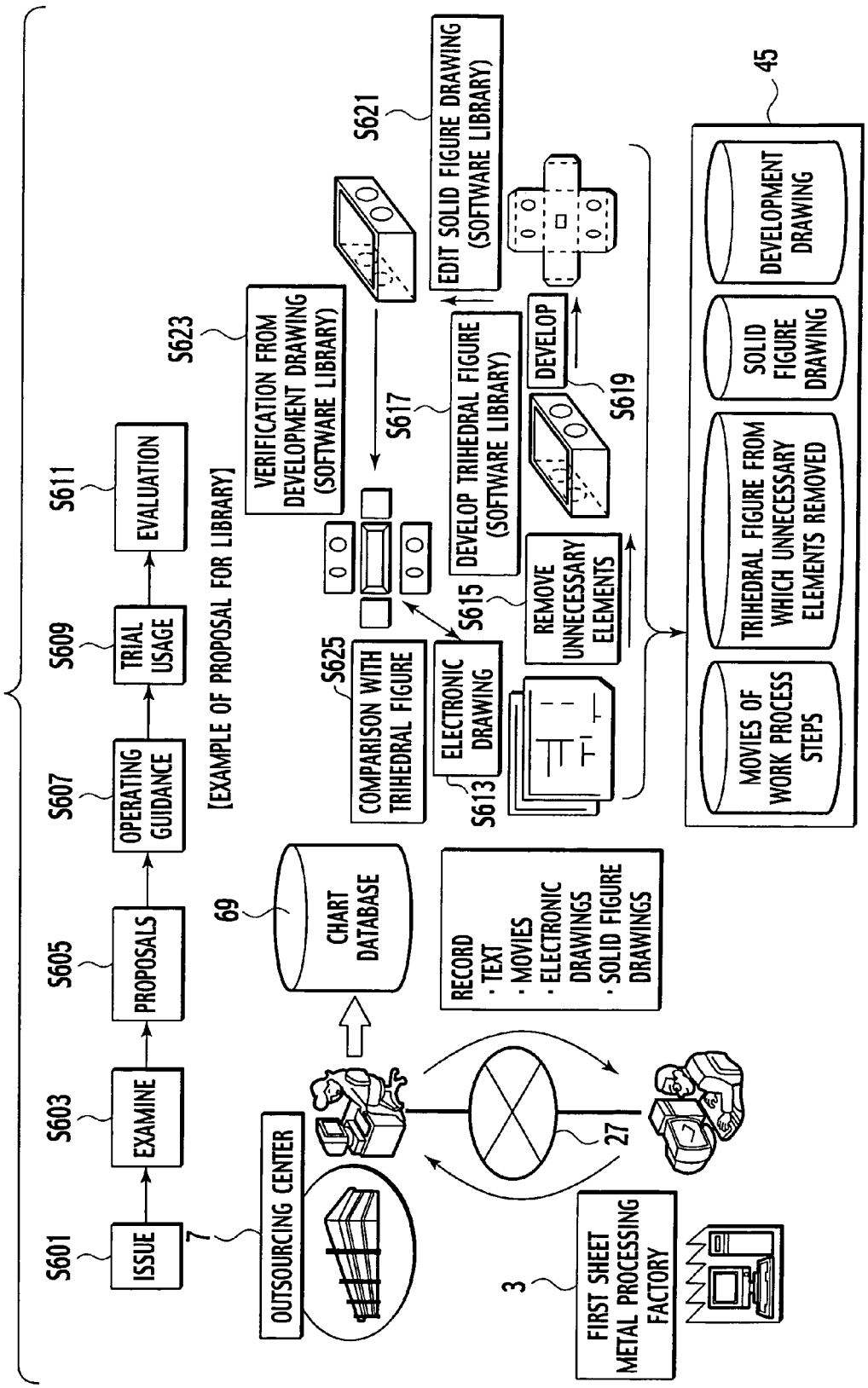
FIG. 6 is an explanatory drawing showing the subject of contents for presentation

Contents for presentation used in a case in which reduction in work time results due to library recommendations (recommendations on CAD/CAM software functions)] will now be described with reference to FIG. 6.

In step S601, the first sheet metal processing factory 3 raises an issue with the outsourcing center 7. For example, the first sheet metal processing factory 3 may ask whether the present time required for performance of CAD/CAM operations can be reduced.

In step S603, the outsourcing center 7 investigates the issue raised in step S601.

In step S605, the outsourcing center 7 makes proposals to the first sheet metal processing factory 3. This may include for example a recommendation that the operating time can be reduced by using new CAD/CAM functions.

In step S607, the outsourcing center 7 provides guidance on operating these new functions to the first sheet metal processing factory 3.

In step S609, the first sheet metal processing factory 3 uses these new functions for a prescribed period of time in product design for example, on a trial basis.

In step S611, the first sheet metal processing factory 3 makes an assessment after trial usage of these new functions.

An example of the operation of the above new function will now be described. In step S613, an electronic drawing sent from the first ordering customer 5 is displayed on a display screen.

In step S615, operations to remove unnecessary elements are performed, deleting from the electronic drawing elements other than those for a trihedral figure. Each of the faces for a trihedral figure are then composed, information for sheet thickness is input and a solid figure is created.

In step S617, instructions are added on the type of jointing for abutting portions on the solid figure drawing, to create jointed form of the abutting portions.

In step S619, the solid figure drawing is developed.

In step S621, the solid figure drawing is edited, the locations for dividing the product are decided and the product model is broken down into a plurality of the component parts thereof.

In step S623, major dimensions of the component parts are verified in the development drawing.

In step S625, a comparison is made between the trihedral figure drawing of the electronic drawing and the development drawing verified.

Moving images on the CAD/CAM screen during these operations are accumulated in the chart database 69 and can be used as contents for presentation. Further, as the data of these moving images is also accumulated in the database 45 on the side of the first sheet metal processing factory 3, the first sheet metal processing factory 3 can also use this data as their own know-how.

Figure 7:
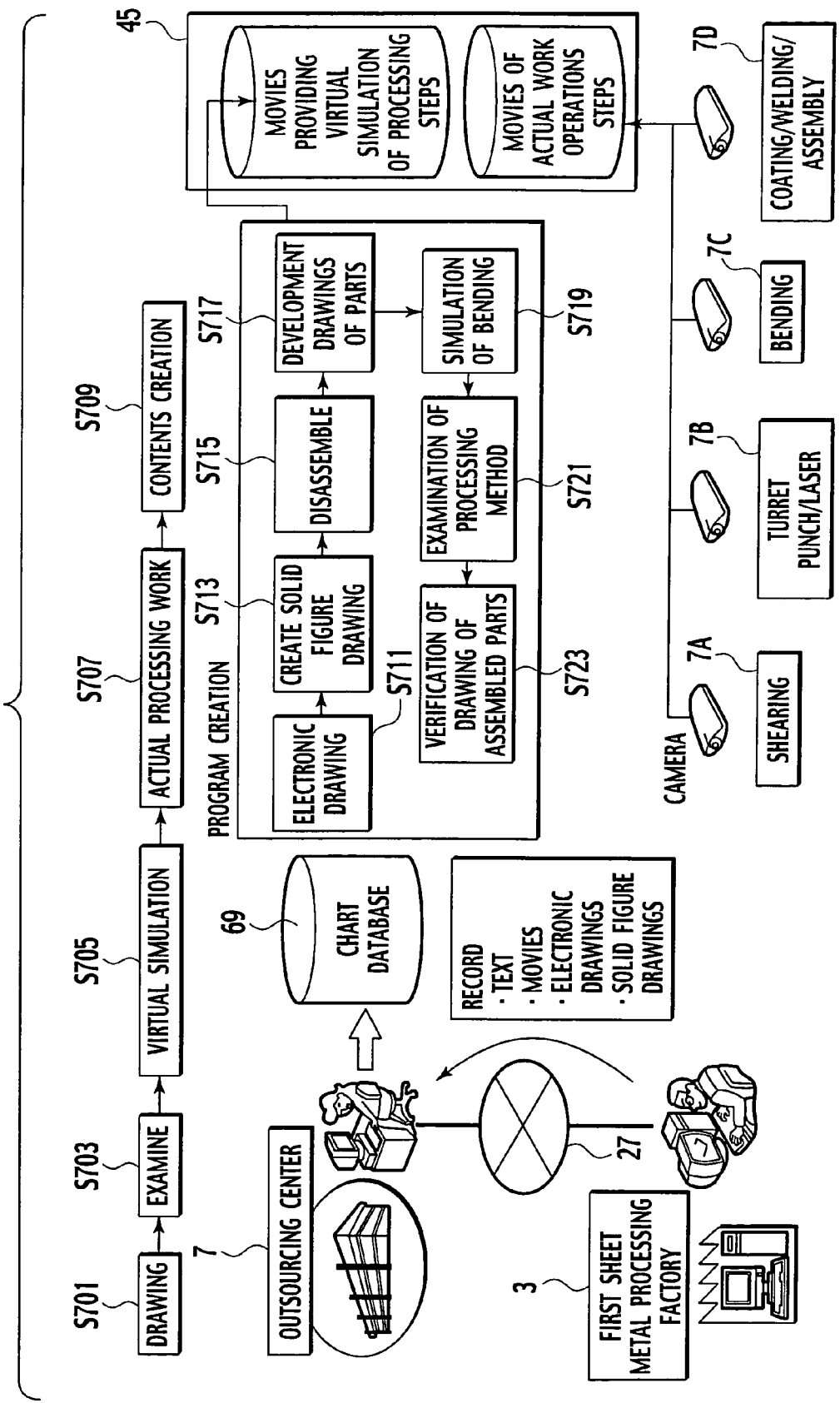
FIG. 7 is an explanatory drawing showing the subject of contents for presentation

Creation of contents for presentation used to appeal to a prospective customer with the strong technical capabilities of the first sheet metal processing factory 3 will now be described with reference to FIG. 7.

In step S701, the first sheet metal processing factory 3 receives product drawings from the first ordering customer 5.

In step S703, the first sheet metal processing factory 3 performs an examination into the processes for manufacturing the product.

In step S705, the first sheet metal processing factory 3 performs a virtual simulation for manufacturing the product on a computer in conjunction with the outsourcing center.

In step S707, processing work is performed using processing machinery to manufacture the product. During the processing operations using the processing machinery images are recorded using for example, a digital camera or the like. The processing work includes shearing processing 7A, turret punch press/laser processing 7B, bending processing 7C and coating/welding/assembly work 7D.

In step S709, contents for presentation is produced.

One example of a virtual simulation in step S705 will now be described.

In step S711, the first sheet metal processing factory 3 receives electronic drawings from the first ordering customer 5.

In step S713, a trihedral figure drawing is extracted from the electronic drawings and the faces are composed, then data for sheet thickness is input to create a solid figure drawing.

In step S715, the locations for dividing up the product into the component parts thereof are determined with reference to the solid figure form drawing and the product model is broken down into a plurality of models of the parts.

In step S717, development of the plurality of parts models divided is performed.

In step S719, a check for any interference of dies and parts is carried out by performing a bending simulation.

In step S721, the processing steps and processing methods are examined.

In step S723, the assembly, welding work and the like are examined for each component part.

This CAD data or image data will then be once associated with actual photograph images for example and stored in the database 45 of the first sheet metal processing factory 3. The stored data is sent to the chart database 69 on the side of the outsourcing center 7, before the contents for presentation are edited and disclosed on the Web site 17 of the outsourcing center.

In this way, proprietary know-how is made into images enabling the first sheet metal processing factory 3 to appeal to customers with the technical strengths they possess by disclosure over the Internet for example.

Figure 8:
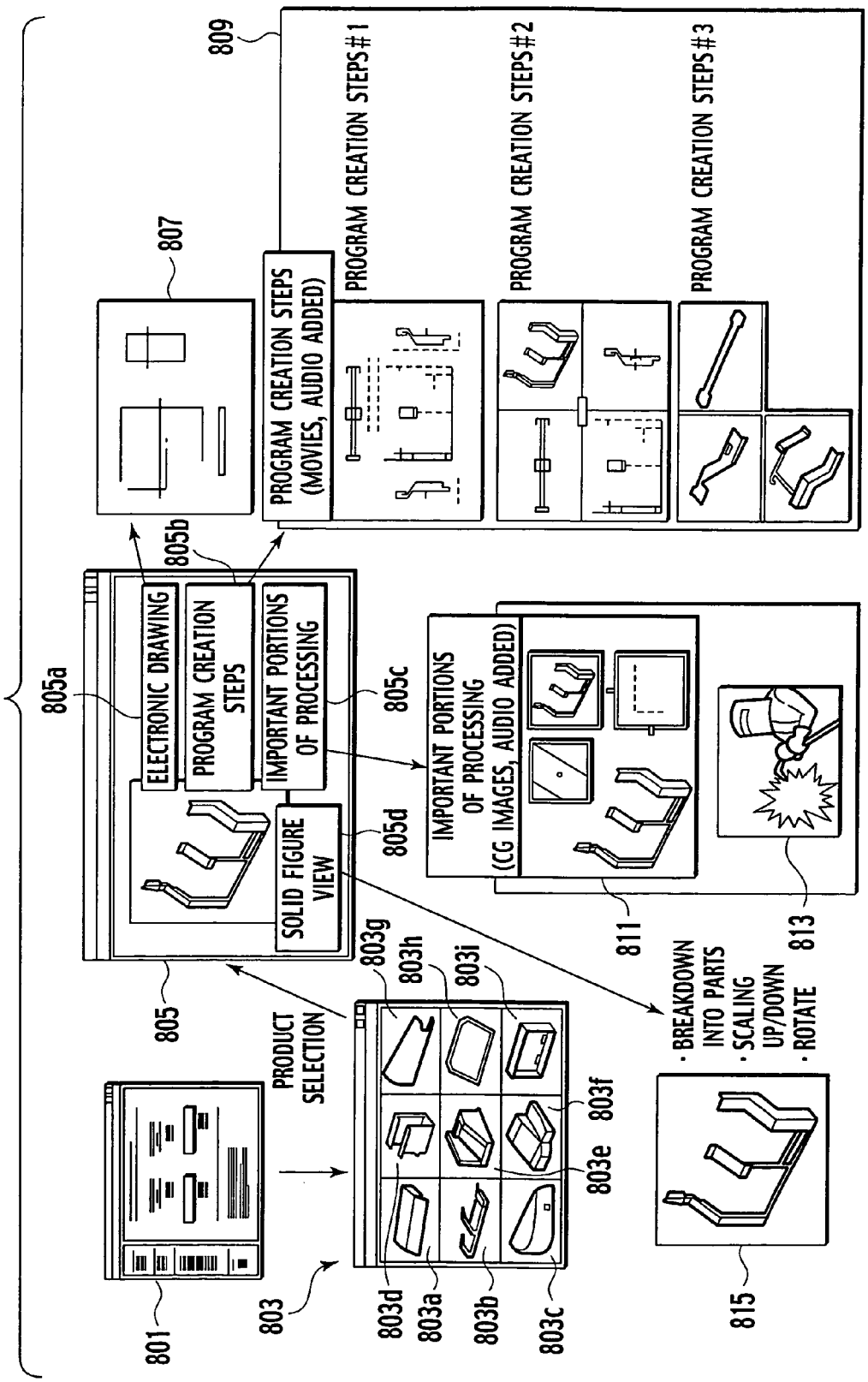
FIG. 8 is an explanatory drawing showing disclosure of contents for presentation

The method for accessing contents for presentation on the Web site 17 of the outsourcing center will now be described with reference to FIG. 8.

When the Web site 17 of the outsourcing center is accessed the top page 801 is displayed on the computer screen. Page 803 describing the different kinds of workpiece for industrial classification can be moved to from this screen.

This page 803 describing different kinds of workpiece for industrial classification includes columns (fields) 803a to 803i. If any of these columns is clicked with a mouse a contents description menu screen 805 describing the processing know-how and the like that went into the displayed product appears. This contents description menu screen 805 includes an electronic drawings menu 805a, a program creation steps menu 805b, a processing important portions menu 805c and a solid figure view menu 805d.

Clicking on the electronic drawings menu 805a displays an electronic drawings screen 807. In this way, the viewer is able to understand what kind of drawings a program (process data) was created from.

Clicking on the program creation steps menu 805b displays a program creation steps screen 809 and movies with accompanying audio are displayed showing the program creation steps. In this way, the viewer is able to easily understand how the program was created.

Clicking on the processing important portions menu 805c displays a processing important portions screen 811 enabling the viewer to see important portions of the processing in CG images with accompanying audio.

Further, on this screen hyperlink text are displayed that are associated with important portions in the processing for the product. Clicking on the hyperlink text displays an actual camera photo image 813. In this way, the viewer can easily find the important portions of processing thereby facilitating an easy understanding of how the product was processed.

Clicking on the solid figure view menu 805d displays a solid figure drawing screen 815. This screen displays a solid figure drawing providing a three-dimensional image of the product from which the solid figure drawing can be broken down into the component parts thereof, expanded, made smaller or rotated. This assists the viewer in understanding the solid figure drawing itself.

Figure 9:
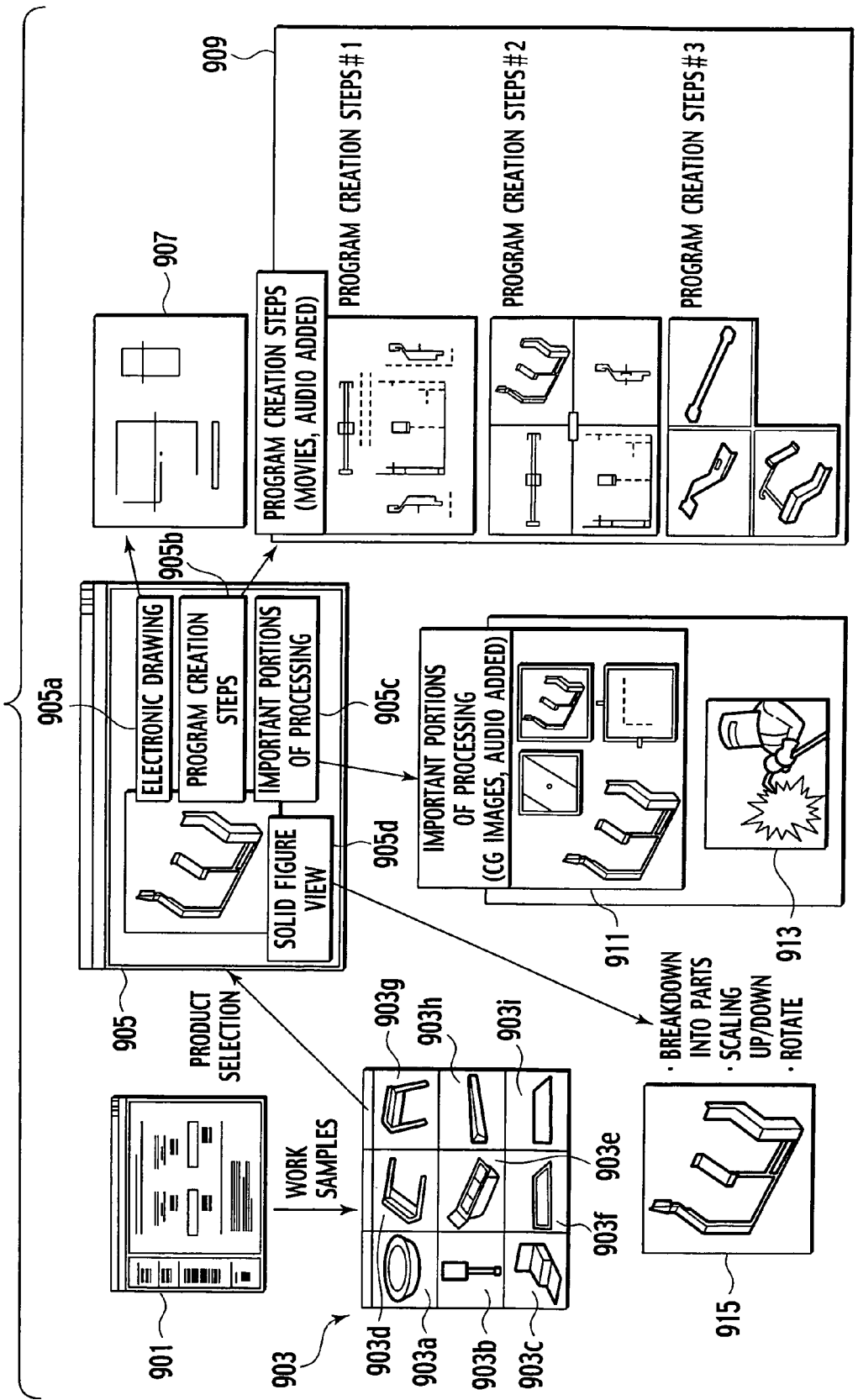
FIG. 9 is an explanatory drawing showing disclosure of contents for presentation

The method for displaying contents for presentation on the Web site 11 of the first sheet metal processing factory will now be described with reference to FIG. 9.

When the Web site 11 of the first sheet metal processing factory is accessed the top page 901 is displayed on the computer screen. Page 903 describing the different kinds of workpiece for industrial classification can be moved to from this screen.

This page 903 describing different kinds of workpiece for industrial classification includes columns 903a to 903i. If any of these columns is clicked with a mouse a contents description menu screen 905 describing the processing know-how and the like that went into the displayed product appears. This contents description menu screen 905 includes an electronic drawings menu 905a, a program creation steps menu 905b, a processing important portions menu 905c and a solid figure view menu 905d.

Clicking on the electronic drawings menu 905a displays an electronic drawings screen 907. In this way, the viewer is able to understand what kind of drawings a program (process data) was created from.

Clicking on the program creation steps menu 905b displays a program creation steps screen 909 and movies with accompanying audio are displayed showing the program creation steps. In this way, the viewer is able to easily understand how the program was created.

Clicking on the processing important portions menu 905c displays a processing important portions screen 911 enabling the viewer to see important portions of the processing in CG images with accompanying audio.

Further, on this screen hyperlink text are displayed that are associated with important portions in the processing for the product. Clicking on the hyperlink text displays an actual camera photo image 913. In this way, the viewer can easily find the important portions of processing.

Clicking on the solid figure view menu 905d displays a solid figure drawing screen 915. This screen displays a solid figure drawing providing a three-dimensional image of the product from which the solid figure drawing can be broken down into the component parts thereof, expanded, made smaller or rotated. This assists the viewer in understanding the solid figure drawing itself.

Figure 10:
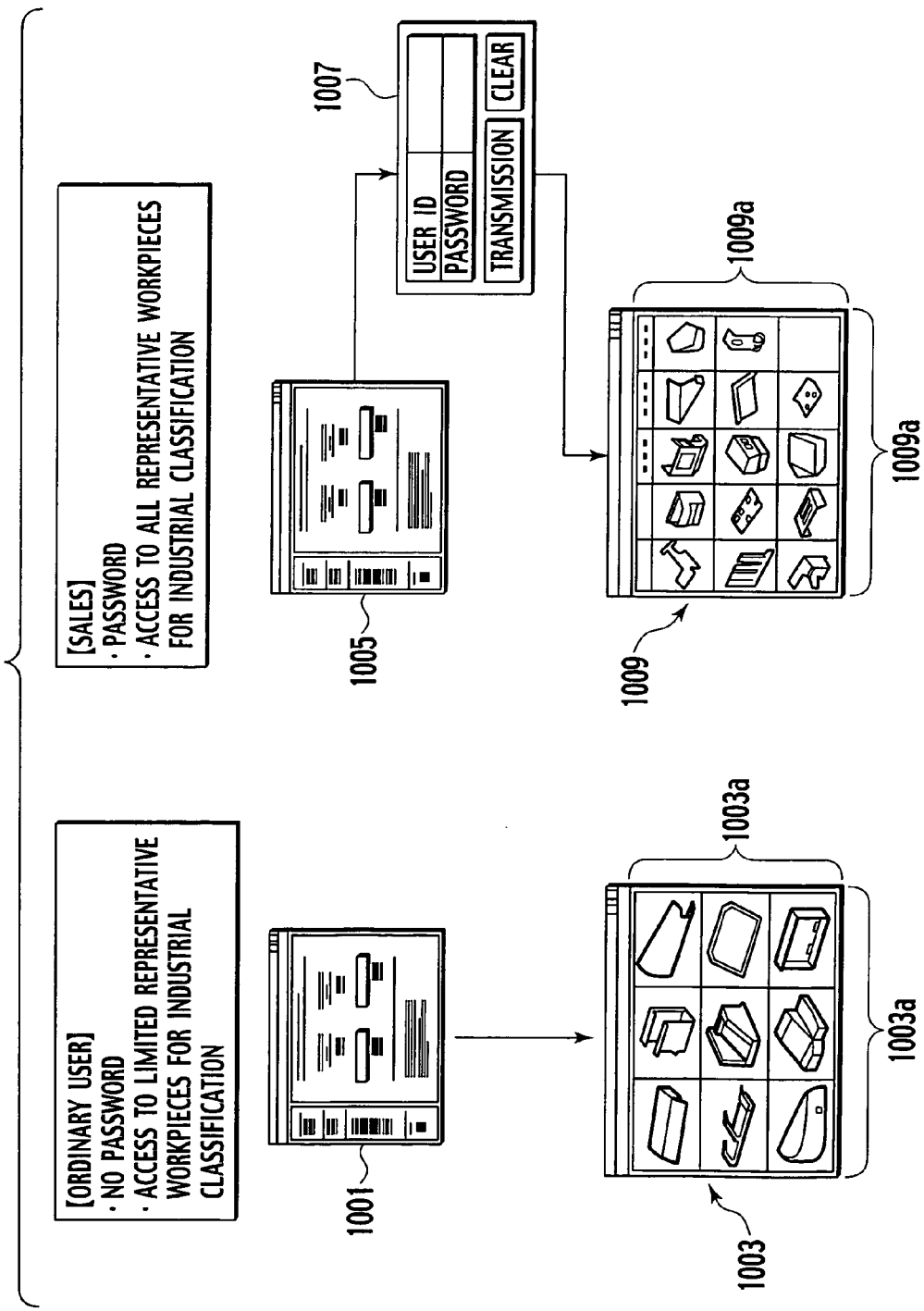
FIG. 10 is an explanatory drawing of the limits constraining usage of contents for presentation.

The conditions for accessing the Web site 17 of the outsourcing center will now be described with reference to FIG. 10.

There are times when the Web site 17 of the outsourcing center is accessed by an ordinary user and times when the Web site 17 of the outsourcing center is accessed by a sales engineer. When accessed by an ordinary user the top page 1001 of the Web site 17 of the outsourcing center is displayed on screen. Then, the ordinary user opens industrial classified workpiece description page 1003 for use by ordinary users. This industrial classified workpiece description page 1003 includes a plurality of columns (fields) 1003*a* each showing the form of a workpiece, however the workpieces shown are restricted.

When accessed by a sales engineer, top page 1005 of the Web site 17 of the outsourcing center opens. When a sales engineer attempts to open industrial classified workpiece description page 1009 for use by sales engineers, user ID and password input frame 1007 is displayed. The industrial classified workpiece description page 1009 that is exclusive to sales engineers opens once the user ID and password are input. This industrial classified workpiece description page 1009 includes a plurality of columns (fields) 1009*a* each showing the form of a workpiece, however here, all workpieces are shown.

The method for creating contents for presentation will now be described with reference to FIGS. 11 to 20.

Figure 11:
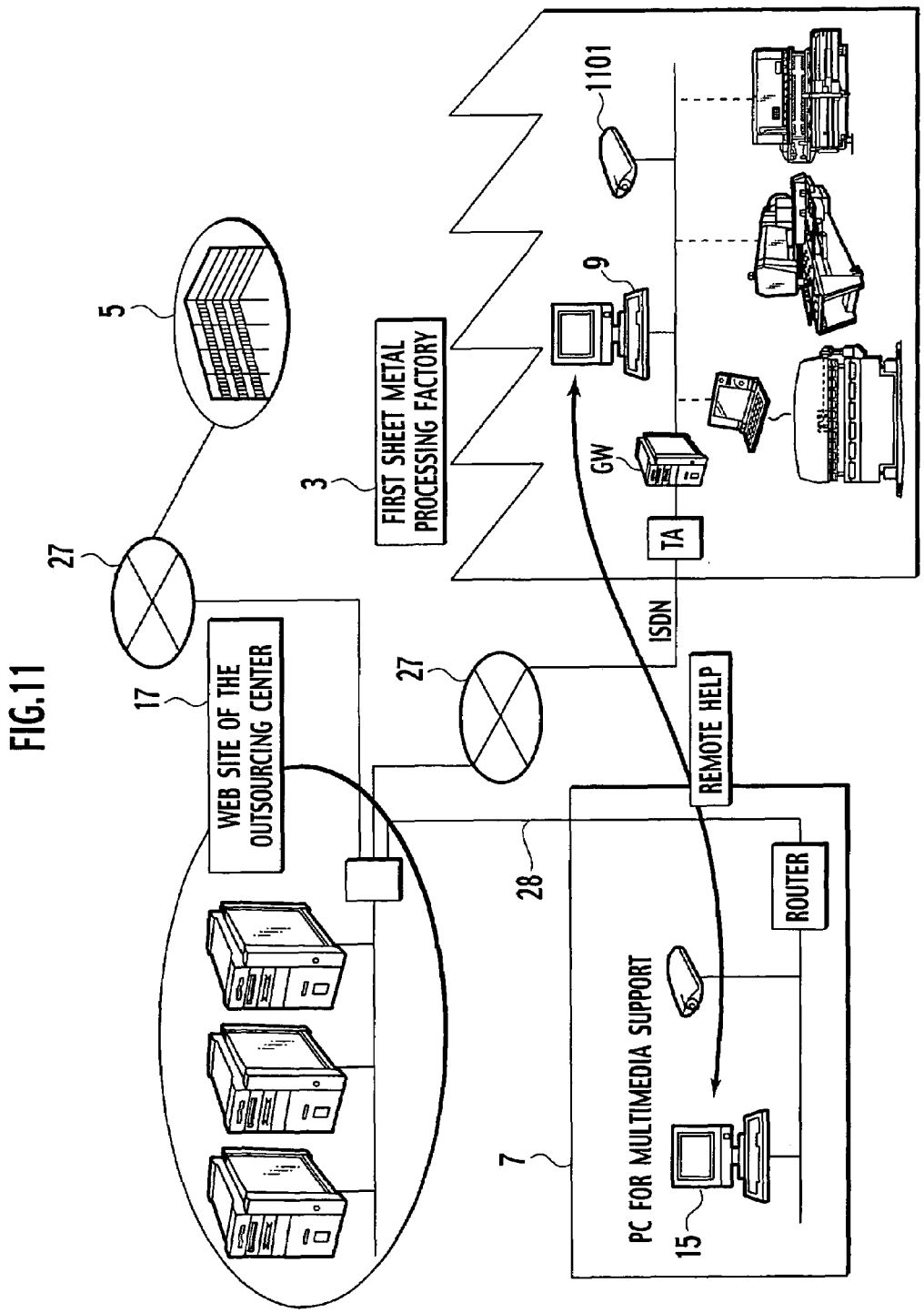
FIG. 11 is an explanatory drawing showing the structure for creating contents for presentation in outline.

FIG. 11 schematically illustrates the structure of the system overall. Here, the computer 9 of the first sheet metal processing factory provided by the first sheet metal processing factory 3, the computer 15 of the outsourcing center provided by the outsourcing center 7 and the Web site 17 of the outsourcing center are mutually connected by a communications system 27, a dedicated line 28 or the like. In this way, the first sheet metal processing factory 3 and the outsourcing center 7 are able to perform an examination to create process data and make an estimate when separated by physical distance. That is to say, a CAD/CAM operator of the outsourcing center 7 logs in to the computer 9 of the first sheet metal processing factory provided via a gateway GW and performs CAD/CAM operations by remote control in accordance with instructions issued by the first sheet metal processing factory 3. These operations are displayed on the screen of the computer 15 of the outsourcing center and can be accumulated as data. Further, image data photographed with a camera 1101 is transmitted to and accumulated by the outsourcing center 7. This data can be edited so that contents for presentation can be created for posting on a Web page.

Again, the computer 13 provided by the first ordering customer 5 and the computer 21 (not shown in the drawing) provided by the second ordering customer 23 (FIG. 2) are connected to the Web site 17 of the outsourcing center via the communications system 27.

Thus, the first ordering customer 5 and the second ordering customer 23 are able to search for a sheet metal processing factory working as partners,.

Figure 12:
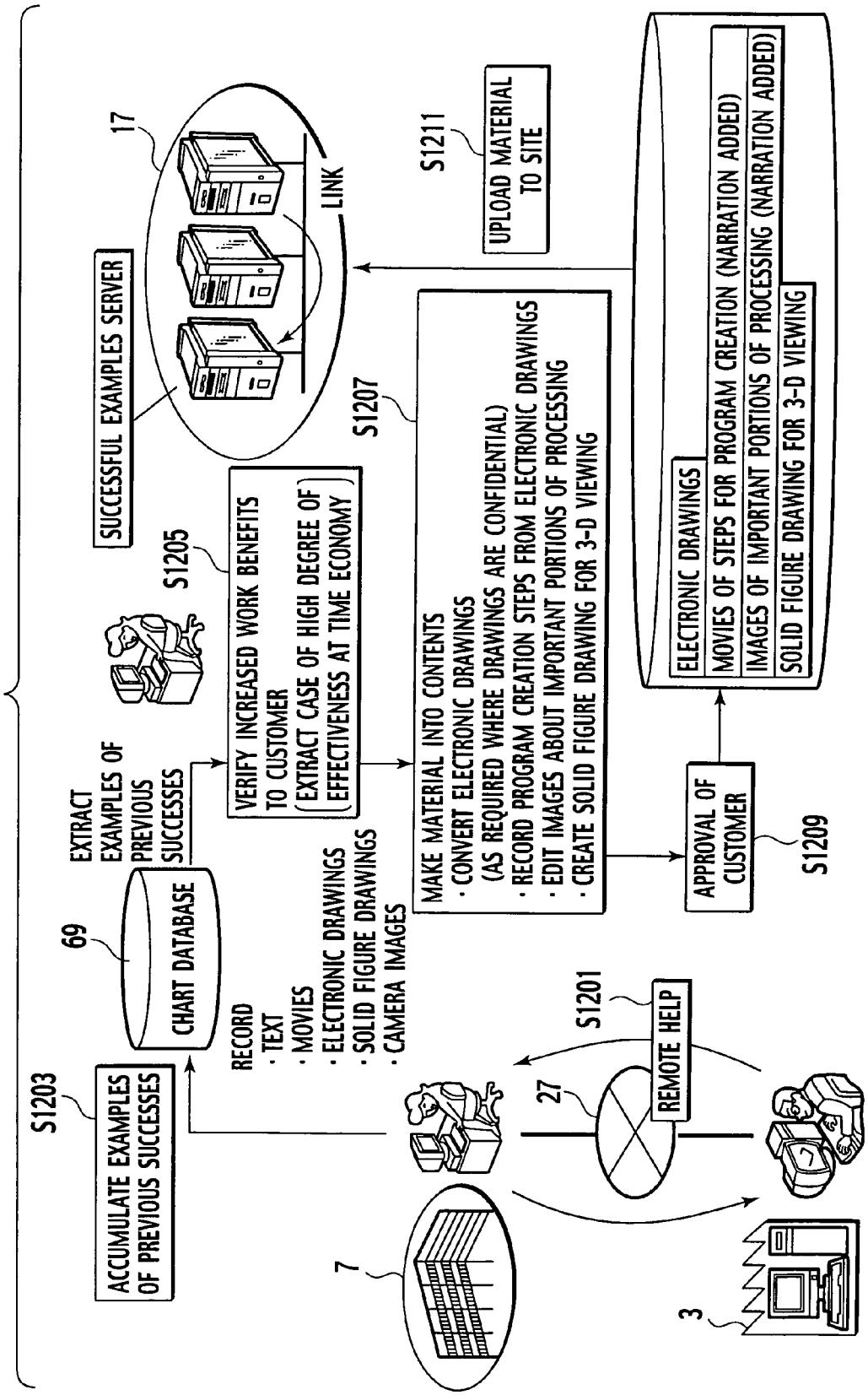
FIG. 12 is an explanatory drawing showing the flow occurring in the creation of contents for presentation.

FIG. 12 depicts the flow occurring when the outsourcing center 7 creates contents for presentation.

In step S1201, the outsourcing center 7 performs outsourcing services by remote control at the request of the first sheet metal processing factory 3.

In step S1203, movies on screen comprising content handled in step S1201 are accumulated in the chart database 69.

In step S1205, examples are extracted that can be used to appeal to customers with a certain effect, such as a case showing a high degree of effectiveness at time economy.

In step S1207, editing of data extracted in step S1205 is performed. This data editing includes electronic drawings conversion required for any duty of confidentiality associated with a drawing, recording images of the steps for creating a program (process data) from electronic drawings, editing images about important portions of processing and creating a solid figure drawing for 3-D viewing.

In step S1209, the outsourcing center 7 obtains the approval of the first sheet metal processing factory 3 for the contents for presentation.

In step S1211, the contents for presentation thus edited are uploaded to the Web site 17 of the outsourcing center.

Figure 13:
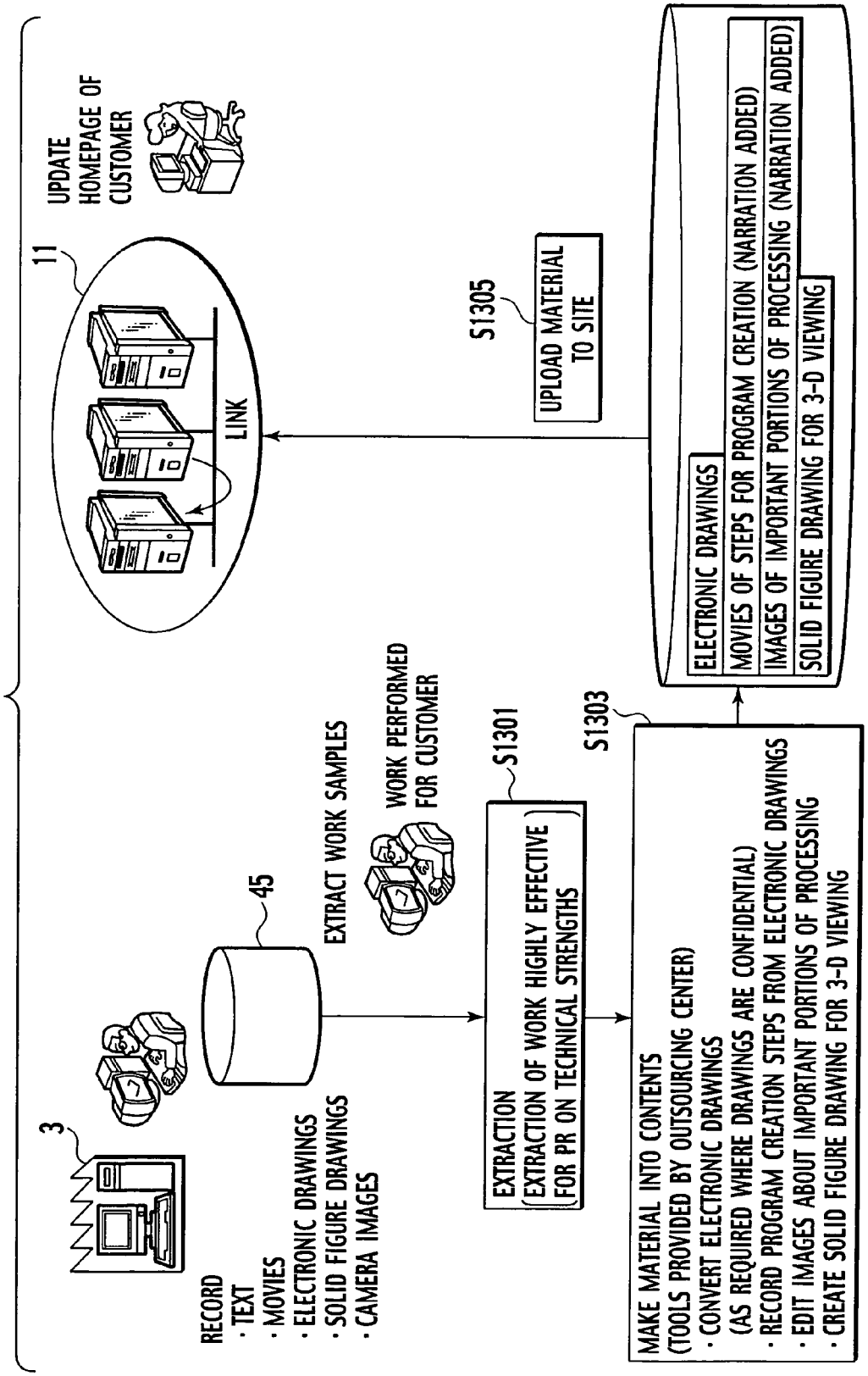
FIG. 13 is an explanatory drawing showing the flow occurring in the creation of contents for presentation.

FIG. 13 shows the flow occurring when the first sheet metal processing factory 3 creates contents for presentation themselves and posts that contents on the Web site 11 of the first sheet metal processing factory.

In step S1301, an example is extracted that can be used to appeal to customers with a certain effect (for example a case showing a high degree of effectiveness at time economy).

In step S1303, the data extracted in step S1301 is edited. This data editing process includes electronic drawings conversion required for any duty of confidentiality associated with a drawing, recording images of the steps for creating a program (process data) from electronic drawings, editing images about important portions of processing and creating a solid figure drawing for 3-D viewing.

In step S1305, the contents for presentation edited are uploaded to the Web site 11 of the first sheet metal processing factory. A link is also formed linking the Web site 11 of the first sheet metal processing factory and the Web site 17 of the outsourcing center.

Figure 14:
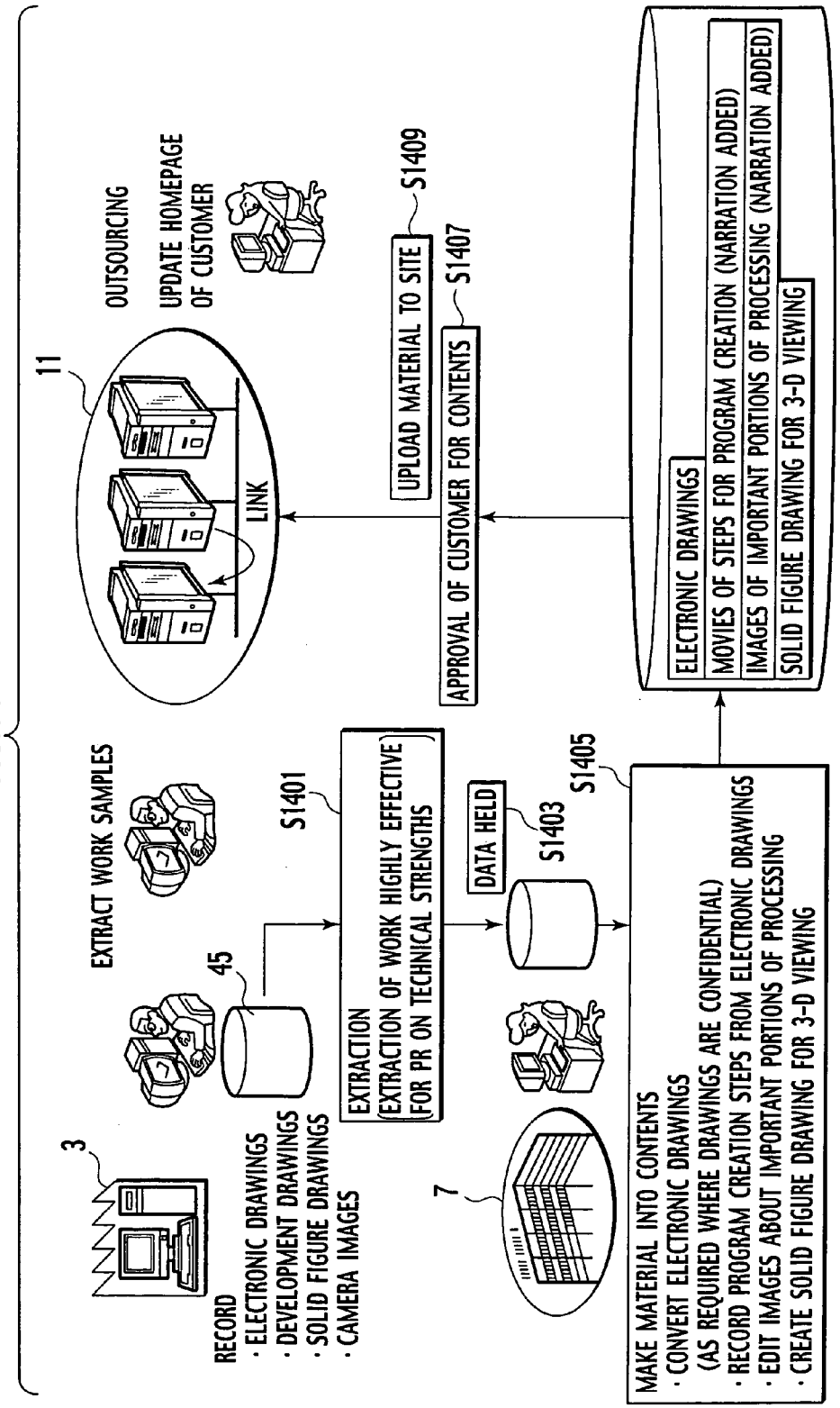
FIG. 14 is an explanatory drawing showing the flow occurring in the creation of contents for presentation.

FIG. 14 shows an example where the first sheet metal processing factory 3 delegates the work of creating contents for presentation to the outsourcing center 7.

In step S1401, the first sheet metal processing factory 3 extracts an example from the database 45 that can be used to appeal to customers with a certain effect (for example a case showing a high degree of effectiveness at time economy).

In step S1403, the data extracted in step S1401 is transmitted to the outsourcing center 7 and the outsourcing center 7 holds this data.

In step S1405, editing of this data is performed. This data editing process includes electronic drawings conversion required for any duty of confidentiality associated with a drawing, recording images of the steps for creating a program (process data) from electronic drawings, editing images about important portions of processing and creating a solid figure drawing for 3-D viewing.

In step S1407, the outsourcing center 7 obtains the approval of the first sheet metal processing factory 3 for the contents for presentation.

In step S1409, the contents for presentation edited are uploaded to the Web site 11 of the first sheet metal processing factory.

Figure 15:
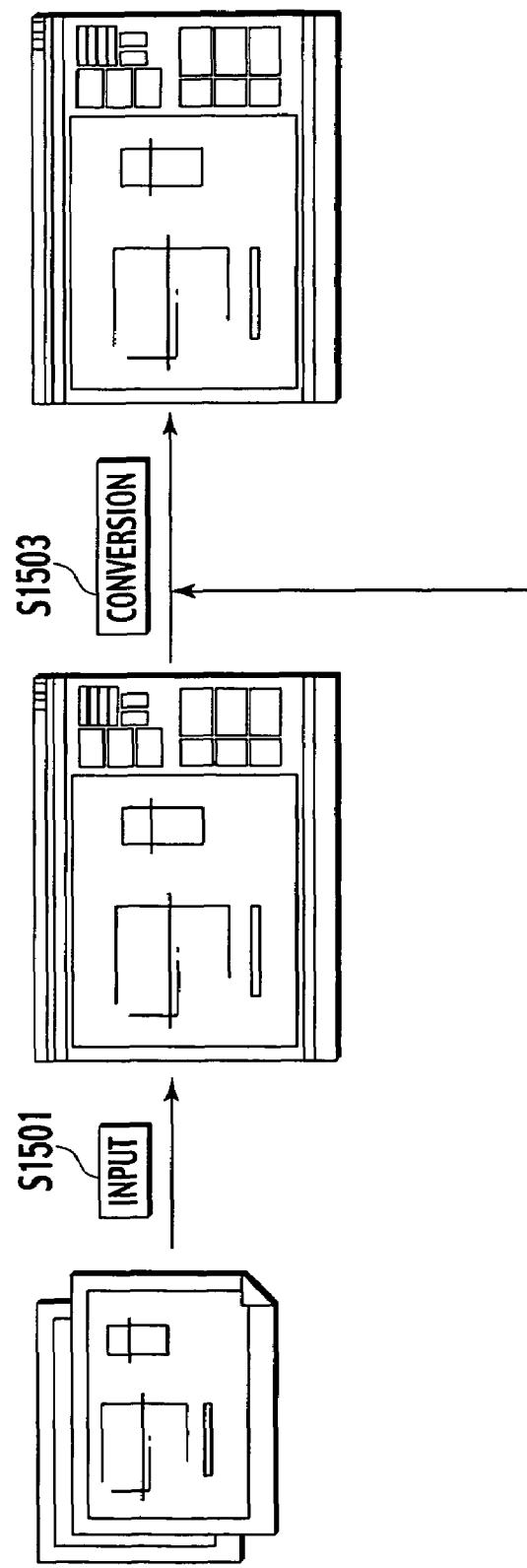
FIG. 15 is an explanatory drawing showing changes made to drawings to conform with confidentiality obligations.

FIG. 15 shows the flow occurring for electronic drawings conversion required due to a duty of confidentiality associated with the drawings (S1207, S1303, S1405).

In step S1501, a drawing transmitted from the first ordering customer 5 is input.

In step S1503, conversion of the drawing is performed. Here, a drawing of the first ordering customer 5 is converted to enhance the effects of the appeal of technical capabilities. Further, the drawing of the first ordering customer 5 is converted to provide enhanced benefit for increased usage of the library (for example such an effect can be increased by using new functions of CAD/CAM software).

Figure 16:
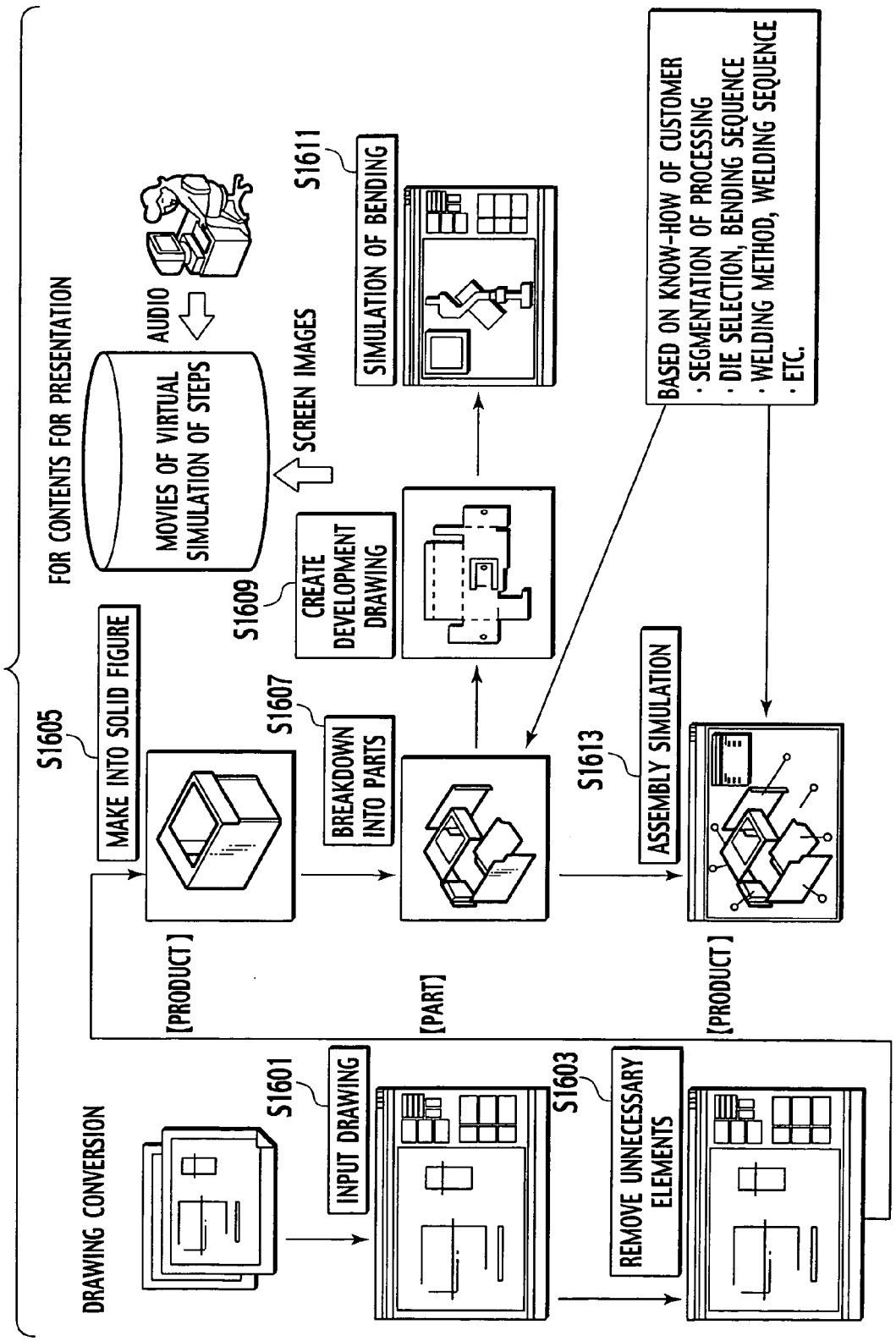
FIG. 16 is an explanatory drawing showing creation of movie contents for presentation.

FIG. 16 shows the flow occurring in the creation of contents for presentation (movies of the steps for creating process data) for a drawing to which a duty of confidentiality applies.

In step S1601, the drawing to be converted is input.

In step S1603, unnecessary elements, for example dimension lines and notes, are deleted in the process of creating a solid figure drawing from the trihedral figure drawing.

In step S1605, the faces on each side of the trihedral figure drawing are composed together, information for sheet thickness is added and a solid figure drawing is created.

In step S1607, dividing edge lines that break the solid figure drawing down into a plurality of the component parts thereof are indicated and solid figure drawings for the plurality of those components are created.

In step S1609, a development drawing is created from the solid figure drawings of each component part.

In step S1611, a check is performed for any interference that may occur between a part and a die by using the development drawing as a reference and performing a simulation of the bending processes.

In step S1613, a simulation of the assembly process is performed with reference to the solid figure drawings of each component part. Audio data is linked to the image data mentioned above and this audio and image data is stored in memory.

Figure 17:
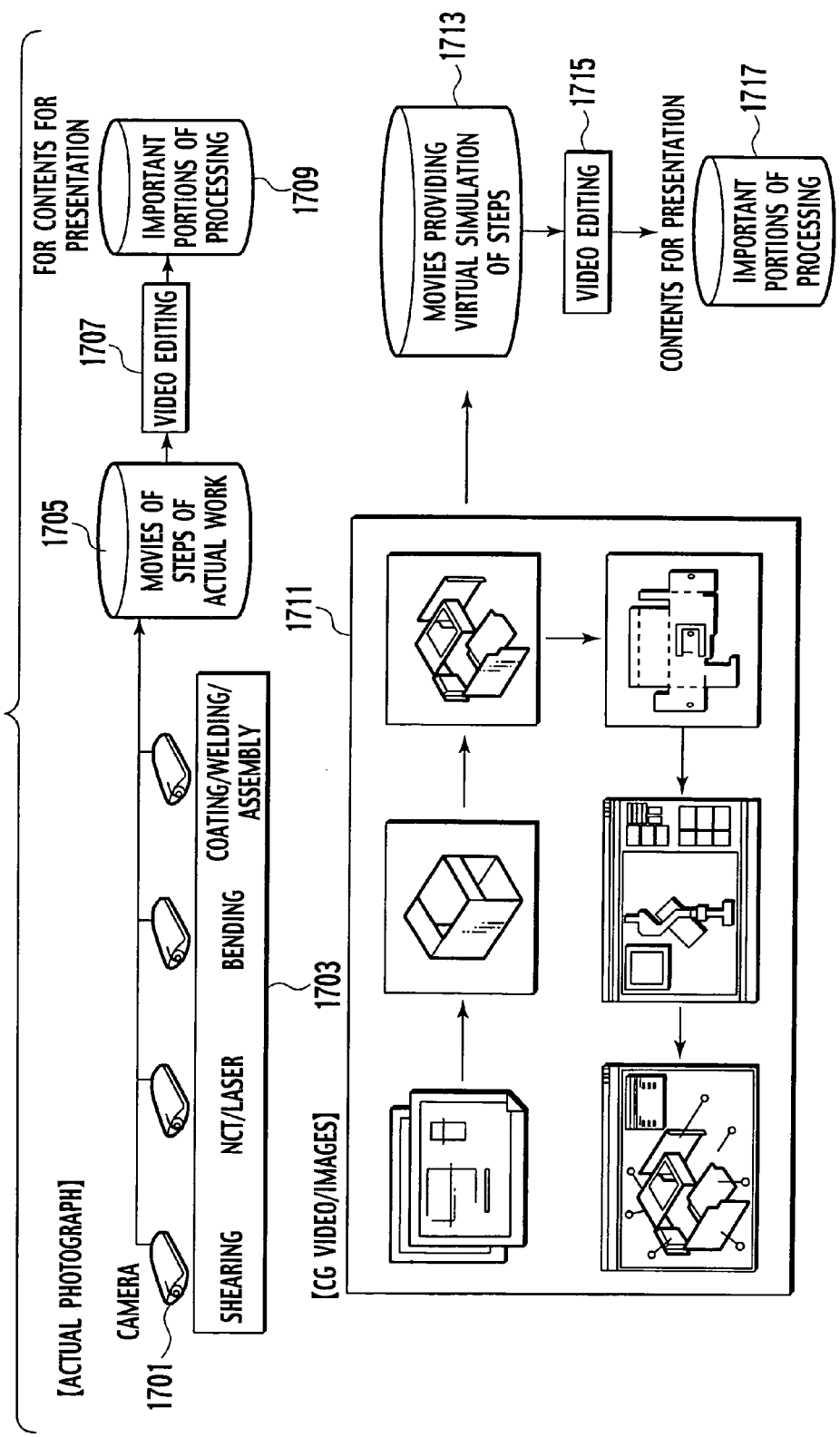
FIG. 17 is an explanatory drawing showing creation of contents for presentation that is video image of important portions of processing.

The flow for creating images on important portions of processing will now be described with reference to FIG. 17.

Where the image is an image from an actual photograph, movies of a processing machine 1703 or the like (e.g. a shearing machine, turret punch press, bending machine or coating, welding or assembling processes) are stored in memory 1705. Video editing 1707 is then performed and important portions of the processing are created. The data on important portions of the processing created is then stored in memory 1709.

In the case of a CG image, movie data 1711 (movies providing a virtual simulation) obtained from movies on screen of CAD/CAM operations (e.g. movies of operation up to creation of process data) are stored in memory 1713. Then editing processes 1715 are performed on the movie data and images on important portions of processing is created. This data on important portions of processing is then stored in memory 1717.

Figure 18:
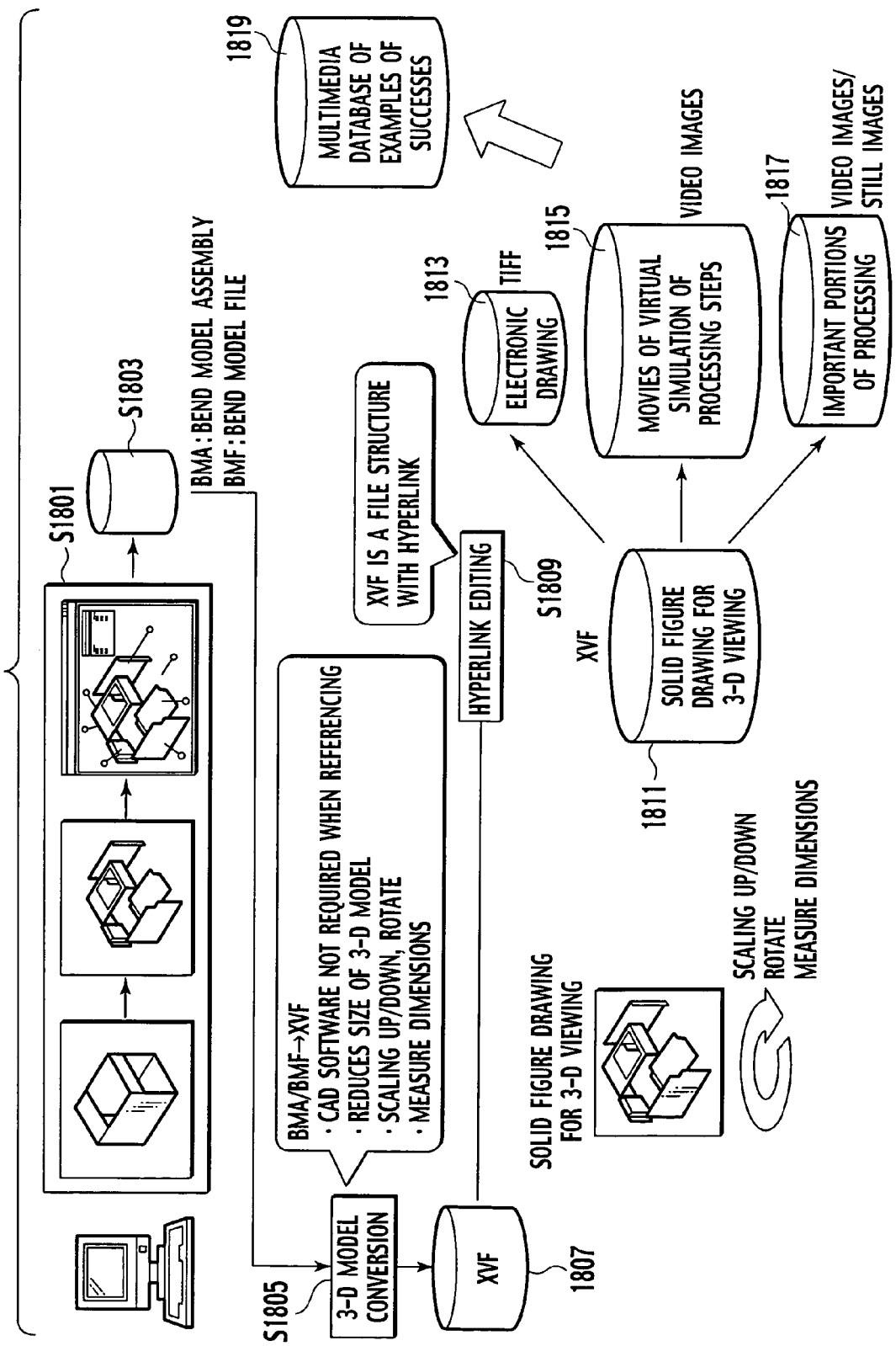
FIG. 18 is an explanatory drawing showing creation of solid figure drawing contents for presentation.

FIG. 18 shows data conversion method that enables a solid figure drawing for 3-D viewing to be accessed from a browser (e.g. Internet Explorer).

In step S1801, a solid figure drawing created using CAD/CAM software (e.g. AP100) is edited and stored in memory 1803.

In step S1805, the 3-D model data (e.g. BMA, BMF) is converted to a data structure (e.g. XVF) having hyperlink and stored in memory 1807.

In step S1809, hyperlink editing is performed on the data (XVF) with hyperlink which is then stored in memory 1811. This edited 3-D data is capable of having a link relationship with graphic data 1813 (e.g. TIFF), video images 1815 or a static image 1817 and the like. 3-D data having a link relationship is stored in a multimedia database of successful examples 1819. In this way, even if a viewer does not possess CAD software the viewer is still able to access contents for presentation.

FIG. 19 shows the structure used for a user (e.g. a sheet metal processing factory, an ordering customer) accessing contents for presentation.

The Web site 17 of the outsourcing center provides a multimedia database of successful examples (or the chart database 69 is also suitable). In response to a request from a user (e.g. the second sheet metal processing factory 19, the second ordering customer 23), the multimedia data (e.g. TIFF, MPEG4, JPEG) of each example of success can be delivered as HTML to the user via the communications system 27 such as the Internet. The user is able to access the contents for presentation in this way.

FIG. 20 shows the function whereby hyperlink is applied to a solid figure drawing 2001 of a product.

When a location of a hyperlink for displaying a photograph of the external appearance of the product that is positioned on the solid figure drawing 2001 of the product is clicked with a mouse for example, a photograph 2003 of the external appearance of the product is displayed on screen.

Mouse clicking on a hyperlink location for displaying program (process data) creation steps that is positioned on the solid figure drawing 2001 of the product displays program creation processes 2005 on screen.

When a location of a hyperlink for displaying the solid figure drawing of disassembled product that is positioned on the solid figure drawing 2001 of the product is clicked with a mouse for example, a solid figure drawing of product disassembled into the component parts 2007 is displayed on screen.

Mouse clicking on a hyperlink location for displaying a solid figure drawing of component part that is positioned on the solid figure drawing of disassembled product 2007, displays a solid figure component drawing 2009 of each of the plurality of component parts on screen.

Mouse clicking on a hyperlink location for displaying dimensions in solid FIG. form that is positioned on a solid figure component drawing 2009 displays a solid figure dimensions 2011 on screen.

When a location of a hyperlink for displaying a development drawing that is positioned over a solid figure component drawing 2009 is clicked with a mouse for example, a development drawing 2013 is displayed on screen.

Mouse clicking on a hyperlink location positioned on a solid figure component drawing 2009 for displaying movies of a simulation of turret punch press processes displays turret punch press process simulation movies 2015 on screen.

When a location of a hyperlink for displaying an image of important portions of processing that is positioned on a solid figure component drawing 2009 is clicked with a mouse for example, image of important portions of processing 2017 is displayed on screen.

FIG. 21 shows the flow occurring when a second sheet metal processing factory 19 for example who has viewed contents for presentation purchases CAD software.

In step S2101, the second sheet metal processing factory 19 that has viewed, via the Internet, an example of a previous success forms a contract to purchase CAD software with the outsourcing center 7 selling CAD software for example.

In step S2103, the CAD software purchased is installed in the computer 25 of the second sheet metal processing factory 19.

In step S2105, the second sheet metal processing factory 19 uses the CAD software on a trial basis, using a bailment license 2109 that allows trial usage for a restricted period of time.

In step S2107, the outsourcing center 7 and the second sheet metal processing factory 19 form a formal contract for sale and purchase of that software. A formal license 2111 is then issued, the outsourcing center 7 receives a formal notification of contract 2115, and the second sheet metal processing factory 19 receives an invoice for expenses required.

FIG. 22 shows support provided for a user using CAD software.

In step S2201, the second sheet metal processing factory 19 asks the outsourcing center 7 a question via Internet telephone for example.

In step S2203, material that would be difficult to convey by Internet telephone only is transmitted bi-directionally between the outsourcing center 7 and the second sheet metal processing factory 19 as camera images.

In step S2205, the computer 15 of the outsourcing center logs into the computer 21 of the second sheet metal processing factory via the communications system 29.

In step S2207, the outsourcing center 7 uses remote control tools to guide the second sheet metal processing factory 19 in the operation of CAD software.

In step S2209, movies of the content of the guidance are edited and transmitted to the second sheet metal processing factory 19.

It is to be understood that the present invention is not limited to the embodiment described above and the invention can be put into practice in other configuration suitably modified.

As described, according to this invention, examples of previous successes acquired through performance of outsourcing services are accumulated and, by presentation of those examples from a Web site, the Web site can be utilized as a new sales channel for a product (software library). That is to say, examples of previous successes accumulated by an outsourcing service center through work support performed by remote control are disclosed on a Web site, moreover, recommendations utilizing replies given during 24 hour 365 days per year service provided to CAD/CAM system users as well as the issuance of licenses on an initial trial use period basis has the effect of leading towards sales from the software library.

Again, as such contents for presentation takes in abundant material including three-dimensional models, actual photographic images and screen images this has the effect of enabling more realistic information to be provided therein.

Further, contents for presentation is converted into data that can be operated, by reproduction of images, on the computer of a customer, thereby providing the effect of allowing such images to be viewed on screen without requiring special software.

Finally, a sheet metal processing factory is able to appeal to customers by promoting their own technical capabilities in product production thereby having the effect of enabling such a factory to acquire new trading partners.

The invention claimed is:

1. A method for outsourcing of services related to the sheet metal working industry, comprising:
    logging in by a computer of an outsourcing center to a computer of a sheet metal processing factory in response to a request from said sheet metal processing factory;
    operating at least one of a CAD system and a CAM system of the computer of the sheet metal processing factory by said computer of the outsourcing center to create processing data for manufacturing a sheet metal product on behalf of the sheet metal processing factory based on instructions from the sheet metal processing factory;
    accumulating information obtained through said creation of the processing data in a database;
    creating contents for presentation by editing the information accumulated in the database, and
    disclosing said contents for presentation.

2. The method according to claim 1,
    wherein the creating contents for presentation includes editing said accumulated information into website contents for promoting sales of a software product for at least one of a CAD system and a CAM system.

3. The method according to claim 1,
    wherein said contents for presentation include at least one of movies, photographs, a solid figure model and images of important portions of processing.

4. The method according to claim 1, further comprising:
    creating a hyperlink relationship between said contents for presentation that are related, to synergetically relate said related contents for presentation together.

5. The method according to claim 1, further comprising:
    accumulating said contents for presentation in said computer of the sheet metal processing factory as knowhow.

6. The method according to claim 1,
    wherein said contents for presentation are created using said computer of the sheet metal processing factory.

7. A system for outsourcing of services related to the sheet metal working industry, comprising:
    a computer of an outsourcing center for logging in to a computer of a sheet metal processing factory in response to a request from said sheet metal processing factory, and operating at least one of a CAD system and a CAM system of said computer of the sheet metal processing factory to create processing data for manufacturing a sheet metal product on behalf of the sheet metal processing factory based on instructions from said sheet metal processing factory;
    a database for accumulating information obtained through said creation of the processing data;
    an information editor for creating contents for presentation by editing the information accumulated in the database, and
    a website for presenting said contents for presentation.

8. The method according to claim 2,
    wherein said contents for presentation include at least one of movies, photographs, a solid figure model and images of important portions of processing.

9. The method according to claim 2, further comprising:
    creating a hyperlink relationship between said contents for presentation that are related, to synergetically relate said related contents for presentation together.

10. The method according to claim 3, further comprising:
    creating a hyperlink relationship between said contents for presentation that are related, to synergetically relate said related contents for presentation together.

11. The method according to claim 2, further comprising:
    accumulating said contents for presentation in said computer of the sheet metal processing factory as knowhow.

12. The method according to claim 3, further comprising:
    accumulating said contents for presentation in said computer of the sheet metal processing factory as knowhow.

13. The method according to claim 4, further comprising:
    accumulating said contents for presentation in said computer of the sheet metal processing factory as knowhow.

14. The method according to 2,
    wherein said contents for presentation are created using said computer of the sheet metal processing factory.

15. The method according to claim 3,
wherein said contents for presentation are created using said computer of the sheet metal processing factory.

16. The method according to claim 4,
wherein said contents for presentation are created using said computer of the sheet metal processing factory.

17. The method according to claim 5,
wherein said contents for presentation are created using said computer of the sheet metal processing factory.

* * * * *